US011783005B2

(12) United States Patent
Cobb et al.

(10) Patent No.: US 11,783,005 B2
(45) Date of Patent: Oct. 10, 2023

(54) CLASSIFYING AND MAPPING SENTENCES USING MACHINE LEARNING

(71) Applicant: Bank of America Corporation, Charlotte, NC (US)

(72) Inventors: Matthew I. Cobb, Huntersville, NC (US); Melissa A. Fraser, Fort Mill, SC (US); Arjun Thimmareddy, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 1076 days.

(21) Appl. No.: 16/557,785

(22) Filed: Aug. 30, 2019

(65) Prior Publication Data
US 2020/0342334 A1    Oct. 29, 2020

Related U.S. Application Data

(60) Provisional application No. 62/838,978, filed on Apr. 26, 2019.

(51) Int. Cl.
*G06F 16/906*    (2019.01)
*G06F 16/958*    (2019.01)
(Continued)

(52) U.S. Cl.
CPC ............ *G06F 16/972* (2019.01); *G06F 16/35* (2019.01); *G06F 40/205* (2020.01); *G06F 40/289* (2020.01)

(58) Field of Classification Search
CPC ....... G06N 20/00; G06F 17/16; G06F 40/205; G06K 9/6215; G06K 9/628; G06V 30/40
(Continued)

(56) References Cited

U.S. PATENT DOCUMENTS

| 6,424,997 B1 | 7/2002 | Buskirk, Jr. et al. |
| 6,584,456 B1 | 6/2003 | Dom et al. |

(Continued)

FOREIGN PATENT DOCUMENTS

| CN | 101253514 B | 6/2012 |
| WO | 2004097568 A2 | 11/2004 |

(Continued)

OTHER PUBLICATIONS

Cobb, M. I. et al., "Mapping Documents Using Machine Learning," U.S. Appl. No. 16/557,406, filed Aug. 30, 2019, 68 pages.
(Continued)

*Primary Examiner* — Marcellus J Augustin

(57) ABSTRACT

A device that includes an enterprise data indexing engine (EDIE) configured to obtain a set of sentences from a document and to compare the words from each of the sentences to a set of keywords. The EDIE is further configured to identify one or more sentences that do not contain any of the keywords and to associate the identified sentences with a first classification type. The EDIE is further configured to identify a sentence that contains one or more keywords and to associate the sentence with a second classification type. The EDIE is further configured to link together the sentence that is associated with the second classification type and the sentences that are associated with the first classification type. The EDIE is further configured to obtain a classification description and a token and to link the classification description and its token with the classified sentences.

20 Claims, 13 Drawing Sheets

(51) Int. Cl.
*G06F 16/35* (2019.01)
*G06F 40/205* (2020.01)
*G06F 40/289* (2020.01)

(58) Field of Classification Search
USPC ............... 382/100–102, 154–160, 224–229; 706/12–20; 707/705–785
See application file for complete search history.

(56) References Cited

U.S. PATENT DOCUMENTS

| | | | |
|---|---|---|---|
| 6,587,876 B1 | 7/2003 | Mahon et al. | |
| 6,621,930 B1 | 9/2003 | Smadja | |
| 6,684,202 B1 | 1/2004 | Humphrey et al. | |
| 6,789,230 B2 | 9/2004 | Katariya et al. | |
| 6,920,609 B1 | 7/2005 | Manber et al. | |
| 6,938,053 B2 | 8/2005 | Jaro | |
| 7,124,149 B2 | 10/2006 | Smith et al. | |
| 7,149,347 B1 | 12/2006 | Wnek | |
| 7,200,563 B1 | 4/2007 | Hammit et al. | |
| 7,295,965 B2 | 11/2007 | Haigh et al. | |
| 7,561,734 B1 | 7/2009 | Wnek | |
| 7,567,895 B2 | 7/2009 | Chen et al. | |
| 7,606,782 B2 | 10/2009 | Haley | |
| 7,764,830 B1 | 7/2010 | Wnek | |
| 7,769,759 B1 | 8/2010 | Gartung et al. | |
| 7,835,911 B2 | 11/2010 | Balchandran et al. | |
| 8,051,372 B1 | 11/2011 | Sandhaus | |
| 8,112,268 B2 | 2/2012 | Chen et al. | |
| 8,189,905 B2 | 5/2012 | Eaton et al. | |
| 8,239,335 B2 | 8/2012 | Schmidtler et al. | |
| 8,260,756 B2 | 9/2012 | Heiss et al. | |
| 8,327,414 B2 | 12/2012 | Strassner et al. | |
| 8,346,683 B2 | 1/2013 | Dybala et al. | |
| 8,370,129 B2 | 2/2013 | Zhang | |
| 8,375,061 B2 | 2/2013 | Aggarwal | |
| 8,380,492 B2 | 2/2013 | Xu et al. | |
| 8,380,511 B2 | 2/2013 | Cave et al. | |
| 8,392,820 B2 | 3/2013 | Tsai et al. | |
| 8,587,613 B2 | 11/2013 | Wang et al. | |
| 8,620,836 B2 | 12/2013 | Ghani et al. | |
| 8,631,033 B2 | 1/2014 | Anderson et al. | |
| 8,661,499 B2 | 2/2014 | Natarajan et al. | |
| 8,793,781 B2 | 7/2014 | Grossi et al. | |
| 8,931,033 B2 | 1/2015 | Esteve Balducci et al. | |
| 8,948,511 B2 | 2/2015 | Ortega et al. | |
| 9,058,319 B2 | 6/2015 | Balchandran et al. | |
| 9,092,802 B1 | 7/2015 | Akella | |
| 9,141,652 B2 | 9/2015 | Seamon | |
| 9,195,640 B1 | 11/2015 | Donneau-Golencer et al. | |
| 9,336,689 B2 | 5/2016 | Romriell et al. | |
| 9,348,920 B1 | 5/2016 | Kesin | |
| 9,471,883 B2 | 10/2016 | Chatterjee et al. | |
| 9,607,029 B1 | 3/2017 | Dharmalingam et al. | |
| 9,646,082 B2 | 5/2017 | Al-Kofahi et al. | |
| 9,665,650 B1 | 5/2017 | Hoelzle et al. | |
| 9,800,616 B2 | 10/2017 | Esteve Balducci et al. | |
| 9,818,067 B2 | 11/2017 | Miranda et al. | |
| 9,824,083 B2 | 11/2017 | Ghannam et al. | |
| 9,928,269 B2 | 3/2018 | Bradley et al. | |
| 9,934,285 B1 | 4/2018 | Rehling et al. | |
| 9,959,412 B2 | 5/2018 | Strauss et al. | |
| 10,007,667 B2 | 6/2018 | Garg | |
| 10,019,535 B1 | 7/2018 | Madhani et al. | |
| 10,031,907 B2 | 7/2018 | Bell et al. | |
| 10,055,402 B2 | 8/2018 | Sengupta et al. | |
| 10,089,297 B2 | 10/2018 | Smith | |
| 10,169,305 B2 | 1/2019 | Indenbom et al. | |
| 10,216,833 B2 | 2/2019 | Kannan et al. | |
| 10,650,086 B1* | 5/2020 | Knudson ................ G06F 40/134 |
| 11,604,981 B2* | 3/2023 | Tripathi .................. G06N 3/08 |
| 2007/0112838 A1* | 5/2007 | Bjarnestam ............ G06F 16/48 |
| | | | 707/999.102 |
| 2007/0198459 A1 | 8/2007 | Boone et al. | |
| 2009/0116755 A1 | 5/2009 | Neogi et al. | |
| 2010/0042623 A1 | 2/2010 | Feng et al. | |
| 2011/0196870 A1 | 8/2011 | Schmidtler et al. | |
| 2011/0255782 A1 | 10/2011 | Welling et al. | |
| 2011/0255784 A1 | 10/2011 | Welling et al. | |
| 2011/0255794 A1 | 10/2011 | Neogi et al. | |
| 2012/0016863 A1 | 1/2012 | Bernhardt et al. | |
| 2012/0041937 A1 | 2/2012 | Dhillon et al. | |
| 2012/0253792 A1 | 10/2012 | Bespalov et al. | |
| 2013/0066818 A1 | 3/2013 | Assadollahi et al. | |
| 2013/0124193 A1 | 5/2013 | Holmberg | |
| 2015/0294220 A1 | 10/2015 | Oreif | |
| 2016/0350672 A1 | 12/2016 | Snyder et al. | |
| 2017/0220585 A1 | 8/2017 | Yamamoto et al. | |
| 2017/0329863 A1* | 11/2017 | Metz .................... G06F 40/134 |
| 2018/0365593 A1* | 12/2018 | Galitsky ............... G06N 5/022 |
| 2019/0057068 A1* | 2/2019 | Diamond .............. G06F 40/197 |
| 2021/0034815 A1* | 2/2021 | Hoshino ................. G06N 7/01 |

FOREIGN PATENT DOCUMENTS

| | | |
|---|---|---|
| WO | 2014064803 A1 | 5/2014 |
| WO | 2016066228 A1 | 5/2016 |
| WO | 2017090051 A1 | 6/2017 |

OTHER PUBLICATIONS

Cobb, M. I. et al., "Parsing Documents Using Markup Language Tags," U.S. Appl. No. 16/557,556, filed Aug. 30, 2019, 64 pages.

Cobb, M. I. et al., "Generating Machine Learning Models for Understanding Sentence Context," U.S. Appl. No. 16/557,646, filed Aug. 30, 2019, 64 pages.

Cobb, M. I. et al., "Classifying and Grouping Sentences Using Machine Learning," U.S. Appl. No. 16/557,700, filed Aug. 30, 2019, 64 pages.

Cobb, M. I. et al., "Identifying Relationships Between Sentences Using Machine Learning," U.S. Appl. No. 16/557,836, filed Aug. 30, 2019, 67 pages.

Cobb, M. I. et al., "Validating Mappings Between Documents Using Machine Learning," U.S. Appl. No. 16/557,871, filed Aug. 30, 2019, 69 pages.

* cited by examiner

```
<html>
<header>
<font face=arial size=1 color=blue> Sample document </font>
</header>
<body>
<section>
<h1> Section 1 </h1>
<p> Lorem ipsum dolor sit amet, consectetur adipiscing elit, sed do eiusmod tempor incididunt ut
labore et dolore magna aliqua. Ut enim ad minim veniam, quis nostrud exercitation ullamco laboris
nisi ut aliquip ex ea commodo consequat. </p> <br>
<p> Duis aute irure dolor in reprehenderit in voluptate velit esse cillum dolore eu fugiat nulla pariatur. Excepteur
sint occaecat cupidatat non proident, sunt in culpa qui officia deserunt mollit anim id est laborum. </p> <br>
</section>
<section>
<h1> Section 2 </h1>
<p> Neque vitae tempus quam pellentesque nec. Faucibus turpis in eu mi. Sed libero enim sed faucibus turpis in
eu mi bibendum. Pretium vulputate sapien nec sagittis aliquam malesuada bibendum arcu vitae. Lacus vestibulum
sed arcu non odio euismod lacinia. Dui vivamus arcu felis bibendum ut tristique et egestas. </p> <br>
<p> Id interdum velit laoreet id donec ultrices tincidunt arcu. Blandit turpis cursus in hac habitasse platea
dictumst quisque. Viverra suspendisse potenti nullam ac tortor vitae. Potenti nullam ac tortor vitae purus
faucibus ornare. Id diam vel quam elementum. </p>
</section>
</body>
</html>
```

Page, Section, Paragraph, Sentence

FIG. 3

| TOKEN | CLASSIFICATION DESCRIPTION-LEVEL 1 | CLASSIFICATION DESCRIPTION-LEVEL 2 |
|---|---|---|
| APO10 | Continually identify and engage with the enterprise stakeholders, document an understanding of the requirements, and make a judgement on the current and future design of governance of enterprise IT | Analyze and identify the internal and external environmental factors and trends in the business environment that may influence governance design |
| MEA03 | Continually identify and engage with the enterprise stakeholders, document an understanding of the requirements, and make a judgement on the current and future design of governance of enterprise IT | Determine the significance of IT and its role with respect to the business |
| APO6 | Continually identify and engage with the enterprise stakeholders, document an understanding of the requirements, and make a judgement on the current and future design of governance of enterprise IT | Consider external regulations, laws, and contractual obligations and determine how they should be applied within the governance of enterprise IT |
| BAI01 | Continually identify and engage with the enterprise stakeholders, document an understanding of the requirements, and make a judgement on the current and future design of governance of enterprise IT | Determine the implications of the overall enterprise control environment with regard to IT |

FIG. 6

CLASSIFYING AND MAPPING SENTENCES USING MACHINE LEARNING

CROSS-REFERENCE TO RELATED APPLICATIONS

This application claims benefit of U.S. Provisional Patent Application No. 62/838,978 filed Apr. 26, 2019 by Matthew I. Cobb, et al, and entitled "ENTERPRISE DATA INDEXING ENGINE," which is incorporated herein by reference as if reproduced in its entirety.

TECHNICAL FIELD

The present disclosure relates generally to machine learning, and more specifically to analyzing documents using machine learning.

BACKGROUND

In current systems, there is no consistent solution for managing document (e.g. laws, rules, and regulation) changes and assessing the impact of these changes across an Enterprise. Existing systems lack the ability to map documents to enterprise policies and standards while ensuring coverage and compliance to regulatory requirements. For example, analyzing documents such as regulations involves identifying requirements that are associated with each regulation. Identifying particular regulations is technically challenging because they are often embedded in dense documents that contain thousands of regulations. In addition, each regulation may need to be interpreted to understand how it applies to a set of other documents (e.g. policies) and controls. Some regulations may be duplicative of each other but may have different wording. Regulations may also have some overlap in scope or a relationship with other regulations. Analyzing documents such as regulations poses several technical challenges for an enterprise. In order to assess the requirements for a set of regulations, each regulation has to be deconstructed down to line level requirements. For a group of 39 regulations with over 9,000 requirements, this process may take over a year to complete using existing techniques.

SUMMARY

In current systems, there is no consistent solution for managing document (e.g. laws, rules, and regulation) changes and assessing the impact of these changes across an Enterprise. Existing systems lack the ability to map documents to enterprise policies and standards while ensuring coverage and compliance to regulatory requirements. For example, analyzing documents such as regulations involves identifying requirements that are associated with each regulation. Identifying particular regulations is technically challenging because they are often embedded in dense documents that contain thousands of regulations. In addition, each regulation may need to be interpreted to understand how it applies to a set of other documents (e.g. policies) and controls. Some regulations may be duplicative of each other but may have different wording. Regulations may also have some overlap in scope or a relationship with other regulations. Analyzing documents such as regulations poses several technical challenges for an enterprise. In order to assess the requirements for a set of regulations, each regulation has to be deconstructed down to line level requirements. For a group of 39 regulations with over 9,000 requirements, this process may take over a year to complete using existing techniques.

The system disclosed in the present application provides a technical solution to the technical problems discussed above by using machine learning to analyze, classify, and map text within documents. The disclosed system provides several practical applications and technical advantages which include 1) a process for deconstructing documents that allows the text within a document to be associated with location identifiers that indicate the location of the text within the document; 2) a process for classifying sentences within a document based on the context of the sentence with respect to other sentences; 3) a process for identifying relationships between text in a document and text in other documents; 4) a process for linking text from a document with a token that can be used to associate the text with other documents; 5) a process for training machine learning models to classify sentences based on the context of the sentences with respect to other sentences; and 6) a process for identifying commonality and overlap between text from different documents.

In one embodiment, a document processing system is configured to map a set of input sentences to a token that can used to map other sentences to the set of input sentences. In this configuration, the system obtains a set of sentences from a document. The system then associates one or more of the sentences with a first classification type, associates one of the sentences with a second classification type, and links the classified sentences together. As an example, the one or more sentences associated with the first classification type may be associated with a classification type that indicates that the sentences are explanatory sentences that provide contextual information. In this example, the sentence associated with the second classification type may be associated with a classification type that indicates that the sentence is an actionable sentence that describes an action to be performed. By linking the sentences together, the system creates a new body of text that provides contextual information for the actionable sentence. The system then determines a set of similarity scores between the classified sentences and a plurality of classification descriptions. The similarity score indicates how similar a classification description is to the classified sentences. A classification description comprises text that is associated with a document. For example, a classification description may comprise text from the document or text describing a document. The system then identifies a classification description that is associated with the highest similarity, identifies a token associated with the identified classification description, and outputs the token.

In one embodiment, a document processing system is configured to ingest a document by deconstructing into logical sections (e.g. paragraphs) that can be used for identifying the location of sentences within the document. In this configuration, the system receives a document that contains text and converts the document into a markup language code (e.g. HTML code). The system then identifies tags (e.g. HTML tags) within the markup language code and parses the markup language code into logical sections (e.g. pages, sections, and paragraphs) based on the tags. The system then identifies sentences within each of the logical sections and links the identified sentences with a location identifier that identifies a location within the document where a sentence is located.

In one embodiment, a document processing system is configured to generate custom machine learning models for classifying sentences. In this configuration, the system receives a document comprising text and converts the document into a markup language code. The system then identifies tags within the markup language code and parses the markup language code into logical sections (e.g. pages, sections, and paragraphs) based on the tags. The system then identifies sentences within each of the logical sections and links the identified sentences with a classification type. The system then uses the classified sentences to train a custom machine learning model. This process allows the machine learning model to be trained using portions (e.g. paragraphs) of a document instead the entire text from the document. This process results in improved speed and accuracy when training machine learning models.

In one embodiment, a document processing system is configured to generate new bodies of text by grouping together sentences from a document. In this configuration, the system receives a set of sentences and compares the words in the sentences to a set of predefined keywords. For example, the keywords may comprise action words that can be used to identify actionable sentences. The system then identifies one or more sentences that do not contain any of the keywords and associates the identified sentences with a first classification type. For example, the identified sentences may be associated with a first classification type that indicates that the sentences are explanatory sentences that provide contextual information. The system then identifies a sentence that contains one or more keywords and associates the sentence with a second classification type. Continuing with the example, the identified sentence may be associated with a classification type that indicates that the sentence is an actionable sentence that describes an action to be performed. The system then links together the sentence that is associated with the second classification type and the sentences that are associated with the first classification type.

In one embodiment, a document processing system is configured to map sentences to custom or user-defined classification descriptions and tokens. In this configuration, the system obtains a set of sentences from a document and compares the words from each of the sentences to a set of keywords. The system then identifies one or more sentences that do not contain any of the keywords and associates the identified sentences with a first classification type. The system then identifies a sentence that contains one or more keywords and associates the sentence with a second classification type. The system then links together the sentence that is associated with the second classification type and the sentences that are associated with the first classification type. The system then obtains a classification description and a token. For example, the classification description and token may be provided by a user. The system then links the classification description and its token with the classified sentences.

In one embodiment, a document processing system is configured to map a set of input sentences to text from another document. In this configuration, the system is configured to receive a set of input sentences and to determine a set of similarity scores between the set of input sentences and a plurality of classification descriptions. The similarity score indicates how similar the set of input sentences are to the text within a classification description. The system then identifies a classification description that is associated with the highest similarity score and identifies a token that is associated with the identified classification description. The system then links the identified token with the set of input sentences.

In one embodiment, a document processing system is configured to validate a mapping between two documents. This process allows the system to identify any overlap or gaps between the two documents. In this configuration, the system obtains a first set of sentences from a first document and determines a first set of similarity scores between the first set of sentences and a plurality of classification descriptions. The system then identifies one or more classification descriptions that have a similarity score that exceeds a predetermined threshold value based on the first set of similarity scores. The system then obtains a second set of sentences from a second document and determines a second set of similarity scores between the second set of sentences and the plurality of classification descriptions. The system then identifies one or more classification descriptions that have a similarity score that exceeds the predetermined threshold value based on the second set of similarity scores. The system then populates a data structure that identifies the tokens within the first set of tokens and the second set of tokens as well as the number of times each token appears. The system then outputs the populated data structure. This process allows a user to quickly identify any overlaps or gaps between the two documents based on the provided data structure.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is an example of markup language code;

FIG. 6 is an example of a classification description;

DETAILED DESCRIPTION

Figure 1:
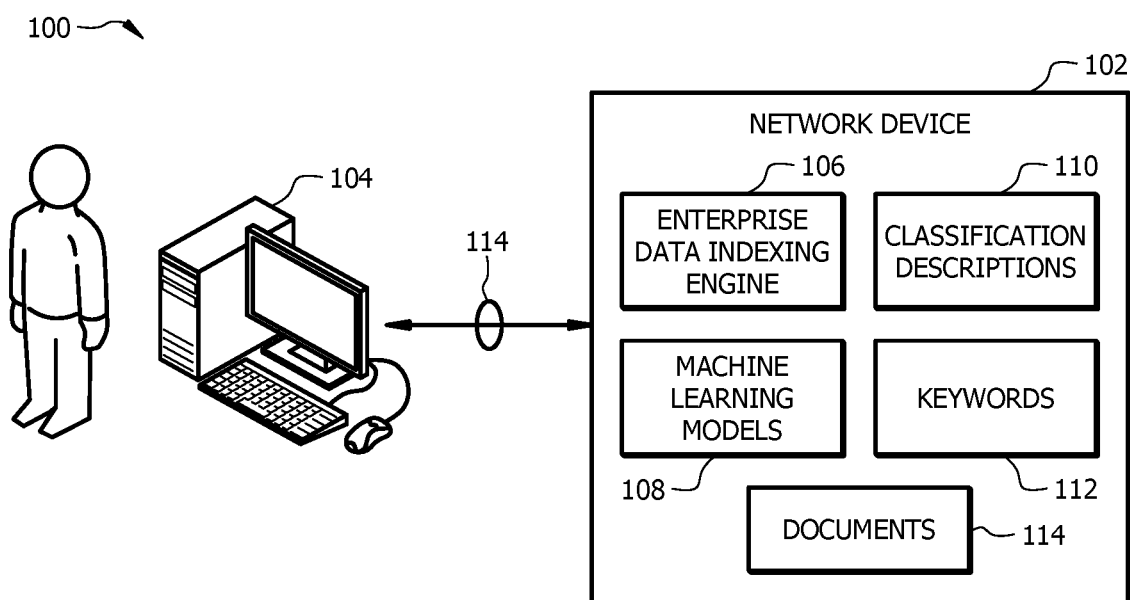
FIG. 1 is a schematic diagram of a document analysis system configured to employ machine learning.

A document processing system comprises an enterprise data indexing engine (EDIE) that is configured to identify requirements from a document and to map the identified requirements to policies and standards in other documents. The EDIE may be further configured to process and implement any support controls based on the mapping. This process provides significant time savings value and provides a consistent methodology for associating requirements with policies. The EDIE uses quick analysis capabilities that are powered by machine learning and provide several technical benefits over existing solutions. In some instances, the EDIE allows time-consuming and complex compliance change assessments to be completed in seconds. The EDIE also provides insight about how an enterprise is covered. For example, the EDIE is capable of highlighting not only an impacted policy but also any connected processes, standards, or controls that would be affected. In addition, the EDIE can identify and connect similar requirements across multiple regulations, which provides knowledge and adaptability with each additional regulatory change assessed.

The EDIE enables the ability to categorize any document or data set. For example, EDIE can be applied to issue statements, business processes, control statements, laws, regulatory, rules, guidelines, or any other suitable type of document. The EDIE is configured to use natural language processing and a custom word vector model that is created utilizing a custom language set related to the data being assessed, for example policy language or regulatory language. Utilizing this method, the EDIE is able to understand and interpret regulation and policies based on the context of the information. The EDIE is further configured to define common classification descriptions based on the EDIE's knowledge from analyzing one or more layers of details from a document. Common classification descriptions may be based on widely accepted industry frameworks such as Control Objectives for Information and Related Technologies (COBIT5) and the National Institute of Standards and Technology (NIST), however, the same methodology can be used for any data set and defined category, including additional frameworks for other areas.

The EDIE is configured to capture, assess, and deconstruct a document into data elements which allows the EDIE to maintain and track the contents of the document for referencing. For example, the EDIE can be configured to track various levels of resolution within a document such as document level, page level, section level, paragraph level, and sentence level. Data elements are extracted from a document and are organized and packaged for assessment. In one embodiment, the EDIE assesses sentences from a document by determining whether each sentence is an "Actionable" or "Explanatory" statement using a custom machine learning model. The EDIE also aligns the content of the sentences for further assessment using custom logic. Extracted data elements are assessed against one or more classification descriptions. Here, the EDIE uses a similarity score to align the packaged data against a classification description. The EDIE is configured to utilize custom logic to assign the packaged data to a common classification description based on its similarity score.

Unlike existing system which simply match keywords, the EDIE understands the context of a sentence. The EDIE identifies requirements in the document that are being assessed. Once the requirements have been identified, the EDIE then aligns the requirements with predefined classification descriptions. The EDIE also provides logic that understands that one requirement may be aligned to multiple classification descriptions. Through this process, the EDIE is able to identify common links between requirements from multiple documents (e.g. laws, rules, regulations, policies, and standards). In some instances, the EDIE's decisioning capability can reduce the overall regulatory review time from approximately 45 days to less than a day. This decisioning solution also enables any regulated business to quickly and accurately understand regulatory requirements and the action required to ensure compliance which may reduce the risk of financial penalties.

Additional information about the EDIE and its functionality is described in U.S. Provisional Patent Application No. 62/838,978 filed Apr. 26, 2019 by Matthew I. Cobb, et al, entitled "*ENTERPRISE DATA INDEXING ENGINE*," which is incorporated herein by reference as if reproduced in its entirety.

Document Analysis System

FIG. 1 is a schematic diagram of the document analysis system 100 configured to employ machine learning. In one embodiment, the document analysis system 100 comprises a network device 102 that is in signal communication with one or more user devices 104. Examples of user devices 104 include, but are not limited to, mobile devices (e.g. smart phones or tablets), computers, laptops, or any other suitable type of device. The document analysis system 100 may be configured as shown or in any other suitable configuration.

The network device 102 and the user device 104 are in signal communication with each other over a network connection. The network may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network may be configured to support any suitable type of communication protocol as would be appreciated by one of ordinary skill in the art.

In one embodiment, the network device 102 comprises an Enterprise Data Indexing Engine (EDIE) 106, one or more machine learning models 108, classification descriptions 110, keywords 112, and documents 114. The network device 102 is generally configured to analyze documents 114 to determine whether a document 114 maps to or aligns with another document 114 based on the text contained within the documents 114. For example, the network device 102 may be configured to analyze a document 114 (e.g. a policy) from a user device 104 to determine whether the document 114 is related to any other stored documents 114. The network device 102 is configured to employ machine learning to identify related documents 114 based on the contents within the documents 114. By employing machine learning, the network device 102 is able to identify related documents 114 regardless of whether the documents 114 contain the exact same text. In other words, the network device 102 is able to identify related documents 114 even if the documents 114 do not have exactly the same text within the documents 114. Additional information about the hardware configuration of the network device 102 is described in FIG. 13.

The EDIE 106 is generally configured to provide the ability to ingest documents 114, to use the content (e.g. text) to understand the context of the document 114, and to determine an overall mapping of content within the document 114 to content within other documents 114.

In one embodiment, the EDIE 106 may be configured to provide a search engine interface (e.g. a web interface or application interface) for a user device 104. For example, the EDIE 106 may be configured to provide an input field that allows a user to input documents 114 or free flowing text (e.g. one or more sentences). The EDIE 106 is configured to analyze and process the input provided by the user device 104 using any of the processes described below.

In one embodiment, the EDIE 106 is configured to ingest and deconstruct documents 114 in a manner that allows the documents 114 to be parsed and mapped to other documents 114. The EDIE 106 may be configured to receive documents 114 in multiple formats which are then broken down into traceable data elements. In one embodiment, this process comprises parsing a document 114 based on Hypertext Markup Language (HTML) tags into different levels of hierarchy such as page level, section level, sub-section level, paragraph level, and sentence level. This allows elements of the document 114 to be annotated and later referenced by the EDIE 106. As an example, the EDIE 106 may receive a Portable Document Format (PDF) document 114 and process the PDF document 114 by converting the PDF document 114 into HTML code. The EDIE 106 may be configured to employ an HTML parser to identify HTML tags within the HTML code that be used with custom logic to identify different elements of the document 114. For example, the custom logic can be used to identify items such as page changes, new sections, paragraph breaks, font changes, etc. based on HTML tags. The HTML parser uses custom logic to determine which HTML tags correspond with different elements of a document 114. For example, the EDIE 106 may comprise logic that detects when a new section starts based on a font change (e.g. bold text or a larger font) for the header of that section. As another example, the EDIE 106 may comprise logic that detects new pages based on HTML tags for page numbers which indicate that a new page is starting. As another example, the EDIE 106 may identify new paragraphs based on consecutive carriage returns (e.g. "/n/n"). An example of the EDIE 106 performing this operation is described in FIG. 2.

In one embodiment, the EDIE 106 is configured to identify different sentence classification types. In one embodiment, the EDIE 106 may be configured to determine a sentence classification type based on the presence of predefined keywords 112. Keywords 112 may comprise any words that can be used for determining a sentence classification type. For example, the EDIE 106 may be configured identify a sentence as an actionable sentence if the sentence contains any keywords 112 that are modal verbs or actions. Examples of modal words or verbs include, but are not limited to, "can," "could," "may," "might," "must," "shall," "should," "will," "need," and "would." In other examples, the keywords 112 may comprise any other types of words that can be compared to the text of a sentence to determine the sentence classification type. In another embodiment, the EDIE 106 may be configured to determine a sentence classification type using a machine learning model 108. An example of the EDIE 106 performing these operations is described in FIG. 4.

In one embodiment, the EDIE 106 is configured to map sentences to a classification description 110. A classification description 110 comprises text that is associated with a document 114. For example, a classification description 110 may comprise text from a document, a description of a document, a description of a document purpose, a summary of a document, a summary of action items from a document, a description of governing practices identified by a document, or any other kind of text description associated with a document 114. Each classification description 110 is linked with a unique identifier or token 602. For example, a classification description 110 may be linked with an alphanumeric value that can be used to reference or identify the classification description 110. This process allows the EDIE 106 to link together sentences with text (e.g. classification descriptions 110) that are associated with different documents 114 by using tokens 602. An example of the EDIE 106 performing this operation is described in FIG. 5.

In one embodiment, the EDIE 106 is configured to obtain a document 114 and process the document 114 to determine whether the contents of the document 114 align or map to contents within other documents 114. For example, the EDIE 106 may parse the document 114 into sentences that are compared to classification descriptions 110 for other documents 114. The EDIE 106 may be configured to output tokens 602 that correspond with classification descriptions 110 for any related documents 114. This process allows the EDIE 106 to identify portions of text from other documents 114 that are related to a set of input sentences. For example, the EDIE 106 may be configured to identify requirements from a previously stored regulation match with a requirement from a new regulation. An example of the EDIE 106 performing this operation is described in FIG. 7.

In one embodiment, the EDIE 106 is configured to map sentences to a custom or user-defined classification description 110. Here, the EDIE 106 is configured to link text with new classification descriptions 110 and token 602 instead of mapping the text to classification descriptions 110 and tokens 602 for existing documents 114. An example of the EDIE 106 performing this operation is described in FIG. 9.

In one embodiment, the EDIE 106 is configured to generate training data for training a machine learning model 108 to classify sentences from a document 114. The training data comprises one or more sentences that are used for training machine learning models 108. For example, the training data may comprise a set of sentences that are each associated with a particular classification type. Examples of classification types include, but are not limited to, explanatory statements, actionable statements, restricted information, classified information, financial information, account information, speculative or predictive sentences, definitive sentences, factual sentences, opinion sentences, past tense sentences, present tense sentences, future tense sentences, contextual sentences, or any other suitable types of sentences. The EDIE 106 may use the training data for adjusting weights, biases, and/or any other machine learning model parameters while training a machine learning model 108. This process allows the EDIE 106 to create training data that improves accuracy when training machine learning models 108 by identifying relationships between sentences. Training a machine learning model 108 using the generated training data allows the machine learning model 108 to learn the context of sentences with respect to other sentences. An example of the EDIE 106 performing this operation is described in FIG. 10.

In one embodiment, the EDIE 106 is configured to compare different documents 114 to determine how the documents 114 align or map to each other. For example, the EDIE 106 may be configured to use language patterning to determine whether an existing policy is missing any requirements from a particular regulation. An example of the EDIE 106 performing this operation is described in FIG. 11.

In one embodiment, the EDIE 106 may be configured to integrate information from multiple systems and sources to identify relationships between the different systems. For example, a device failure in one system can be mapped to a regulatory impact and other related polices. The EDIE 106 can be used to identify information that is related to the failure for determine the impact and severity of the failure. For example, the EDIE 106 may determine business process impact, impacting regulations, impacting policies, or any other related impacts.

Examples of machine learning models 108 include, but are not limited to, a multi-layer perceptron or any other suitable type of neural network model. The machine learning models 108 may comprise different types of machine learning models. For example, the machine learning models 108 may each comprise different weighted functions that are configured to map inputs to different types of information or classification outputs. As example, a machine learning model 108 may be configured to output a vector in response to an input sentence. In this example, the machine learning model 108 may be configured as a word vectoring model. Examples of word vectoring models include, but are not limited to, Doc2Vec—distributed memory model, Word2Vec—collection of a bag of words (CBOW) model, and Skip-Gram model. A vector is a numerical value that is uniquely associated with or mapped to one or more sentences. The vector comprises a unique set of numeric values that correspond with a location in a vector space. In this example, the machine learning model 108 is configured to map a set of input sentences to a numerical vector in a vector space which allows the input sentences to be compared to vectors for other sentences (e.g. classification descriptions 110). In the vector space, the distance between vector represents how similar vectors are to each other. For example, sentences that are represented by vectors that are close to each other in the vector space are more similar than sentences that are represented by vectors that are further apart from each other in the vector space.

As another example, a machine learning model 108 may be configured to output a classification type in response to an input sentence. The machine learning model 108 may be trained to classify a sentence based on the verbs or modal terms used in the sentence, verb tenses, grammatical structure, the content or subject matter of the sentence, or any other characteristics or combination of characteristics of the input sentence.

Document Ingesting

Figure 2:
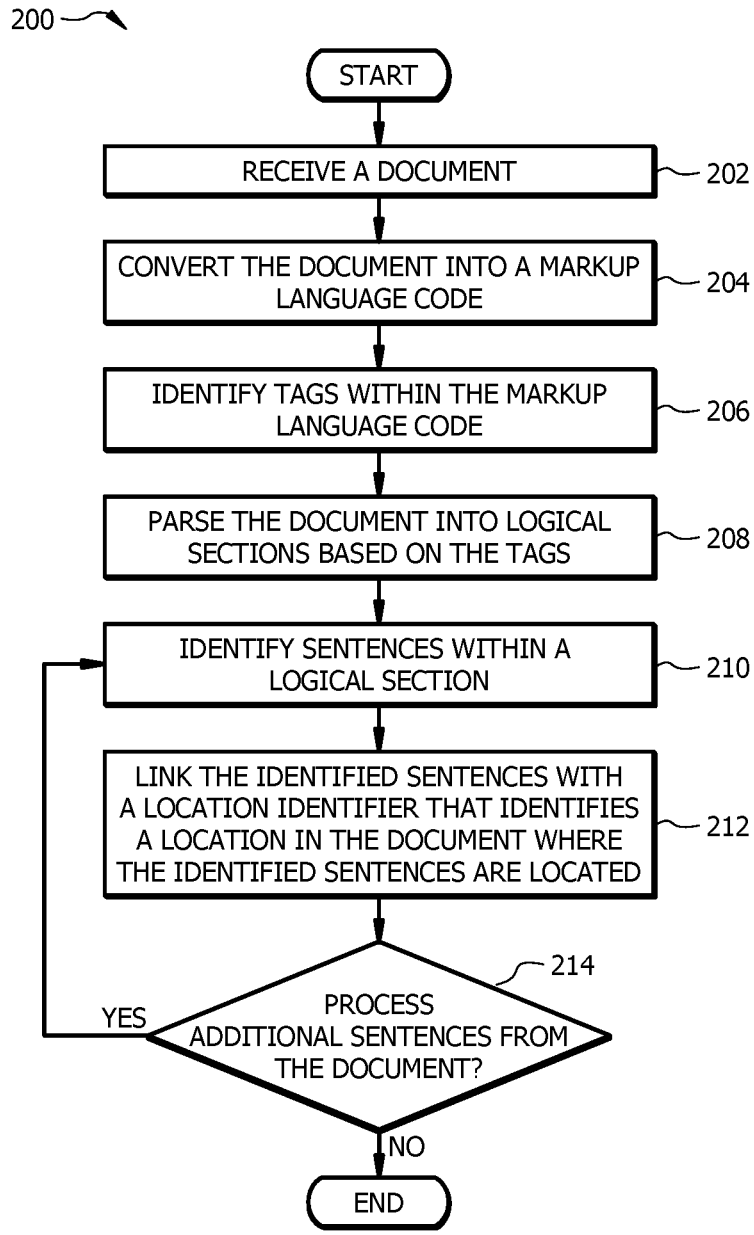
FIG. 2 is a flowchart of an embodiment of a document ingesting method.

FIG. 2 is a flowchart of an embodiment of a document ingesting method 200. The EDIE 106 may employ method 200 to deconstruct documents 114 so that they can be parsed and mapped to other documents 114. This process allows the EDIE 106 to identify and reference the location of text within a document 114. For example, the EDIE 106 may employ method 200 to identify sentences within a document 114 and to associate the sentences with a location identifier that indicates a location where the sentences are located within the document 114. Once the sentences have been associated with a location identifier, the sentences can be later referenced and located within the document 114 for other processes.

At step 202, the EDIE 106 receives a document 114 that comprises text. In one embodiment, the EDIE 106 receives the document 114 from a user device 104. For example, the user device 104 may upload or send the document 114 to the EDIE 106 for processing. In another embodiment, the EDIE 106 receives the document 114 from a memory (e.g. memory 1304). Examples of documents 114 include, but are not limited to, text documents, reports, standards, regulations, policies, rules, regulations, presentations, legal documents, marketing documents, business documents, articles, press releases, or any other suitable type of documents.

At step 204, the EDIE 106 converts the document 114 into a markup language code 300. As an example, the document processing 106 may receive a document 114 as a PDF file and may convert the document 114 into HTML code. For instance, the EDIE 106 may receive the document 114 and employ natural language processing to scan the document 114 to identify different portions (e.g. headers, titles, pages, paragraphs, and sections) of the document 114. The EDIE 106 may then associate HTML tags 302 with the different identified portions of the document 114. For example, the EDIE 106 may identify a page number within the document 114 and associate a page number HTML tag 302 with the identified page number. As another example, the EDIE 106 may identify a header and associate a header HTML tag 302 with identified header. The EDIE 106 may then generate the markup language code 300 that comprises text from the document 114 with its associated HTML tags 302. In other examples, the document 114 and the markup language code 300 may be in any other suitable formats or languages. Examples of markup languages include, but are not limited to, HTML, Extensible Markup Language (XML), or any other suitable markup language. The markup language code 300 comprises a plurality of tags 302 that demarcate portions of the markup language code 300. Referring to FIG. 3 as an example, the markup language code 300 comprises text 304 from the document 114 and a plurality of tags 302. The tags 302 may identify or demarcate headers, font changes (e.g. font size, font types, italics, bolding, and underlines), body portions, titles, sections, paragraphs, pages, or any other suitable portion of the markup language code 300.

Returning to FIG. 2 at step 206, the EDIE 106 identifies tags 302 within the markup language code 300. The EDIE 106 may identify tags 302 associated with pages, sections, paragraphs, or any other suitable type of tags 302. For example, the EDIE 106 may employ a parser (e.g. an HTML parser) to identify the tags 302 within the markup language code 300 based on their syntax. For example, the EDIE 106 may scan the markup language code 300 to identify characters that correspond with tags 302. Referring to FIG. 3 as an example, the EDIE 106 may scan the markup language code 300 to identify instances of the characters '<' and '</' which indicate the presence of a tag 302. For example, the EDIE 106 may identify the tags 302 "<header>" and "</header>" which indicate the beginning and end of a header section. As another example, the EDIE 106 may identify tags 302 "<p>" and "</p>" which indicate the beginning and end of a paragraph. In other examples, the EDIE 106 may identify any other tags 302 within the markup language code 300.

At step 208, the EDIE 106 parses the document 114 into logical sections 306 based on the tags 302. A logical section 306 may correspond with a page, a section, a paragraph, or any portion of the document 114. Examples of logical sections 306 are shown in FIG. 3. As an example, the EDIE 106 may parse the document 114 by identifying a first tag 302 associated with a first page number and a second tag 302 associated with a second page number. The EDIE 106 may the associate the text within the markup language code 300 between the first tag 302 and the second tag 302 as a logical section 306 corresponding with a page of the document 114.

As another example, the EDIE 106 may parse the document 114 by scanning the markup language code 300 to determine a general font for the document 114. Here, the EDIE 106 determines which font is used the most frequently within the document 114. The EDIE 106 understands that this font typically corresponds with general information within the document 114 and that changes from the general font will typically indicate headers for new sections and sub-sections. Examples of font changes include, but are not limited to, size, bold, italics, and underlines. For instance, the EDIE 106 may parse the document 114 by identifying a first tag 302 associated with a first font change and a second tag 302 associated with a second font change. The EDIE 106 may associate the text in the markup language code 300 between the first tag 302 and the second tag 302 as a logical section 306 corresponding with a section of the document 114.

As another example, the EDIE 106 may parse the document 302 by identifying a first tag 302 that corresponds with the beginning of a paragraph and a second tag 302 that corresponds with the end of the paragraph. The EDIE 106 may associate the text in the markup language code 300 between the first tag 302 and the second tag 302 as a logical section 306 that corresponds with a paragraph of the document 114. In other example, the EDIE 106 may identify any other type of logical sections 306 from the document 114 based on the tags 302.

In one embodiment, the EDIE 106 is configured to identify logical sections 306 within other logical sections 306. For example, the EDIE 106 may first identify logical sections 306 that correspond with pages and then may identify logical sections 306 corresponding with sections or paragraphs within the identified pages of the document 114. An example of nested logical sections 306 are shown in FIG. 3.

At step 210, the EDIE 106 identifies sentences within a logical section 306. The EDIE 106 may employ natural language processing to identify any sentences within a logical section 306. For example, the EDIE 106 may identify a logical section 306 and then scan the text within the logical section 306 for punctuation characters. The EDIE 106 may use the identified punctuation as delimiters for identifying sentences within the logical section 306. For instance, the EDIE 106 may identify a logical section 306 that corresponds with paragraph and then scan the text within the paragraph for any punctuation characters (e.g. '.', '?', or '!'). In this example, the EDIE 106 identifies any text that precedes or is between punctuation characters as a sentence. In other examples, the EDIE 106 may employ any suitable natural language processing technique for identifying sentences as would be appreciated by one of ordinary skill in the art.

At step 212, the EDIE 106 links the identified sentences with a location identifier 308 that identifies a location in the document 114 where the identified sentences are located. An example of a location identifier 308 is shown in FIG. 3. Here, the EDIE 106 identifies any tags 302 that are associated with the sentence to determine where the sentence is located. The location identifier 308 may reference any suitable number of logical sections 306 where a sentence is located. For instance, a logical identifier 308 may identify a page within the document 114, a section within the document 114, a paragraph within the document 114, any other suitable logical section 306, or combination of logical sections 306. For example, a location identifier 308 may indicate the following location information: page>section>sub-section>paragraph>sentence. In this example, the location identifier 308 identifies a page, a section, a sub-section, and paragraph where a sentence is located within a document 114 based on the tags 302 associated with the sentence. This process allows the document process engine 106 to associate or link sentences from the document 114 with a location identifier 308 that references the location of the sentences within the document 114. This allows the sentences to be later referenced using their associated location identifiers 308.

At step 214, the EDIE 106 determines whether to process additional sentences from the document 114. For example, the EDIE 106 may determine whether all of the sentences from the document 114 has been linked with a location identifier 308. The EDIE 106 may determine to process additional sentences when at least some of the sentences from the document 114 have not been linked with a location identifier 308. The EDIE 106 may determine not to process additional sentences when the EDIE 106 determines that the sentences from the document 114 have been linked with location identifiers 308. The EDIE 106 returns to step 210 in response to determining to process additional sentences from the document 114. Here, the EDIE 106 continues to identify additional sentences within other logical sections 306 so that they can be linked with location identifiers 308. Otherwise, the EDIE 106 terminates method 200 in response to determining to not process additional sentences from the document 114.

Sentence Grouping

Figure 4:
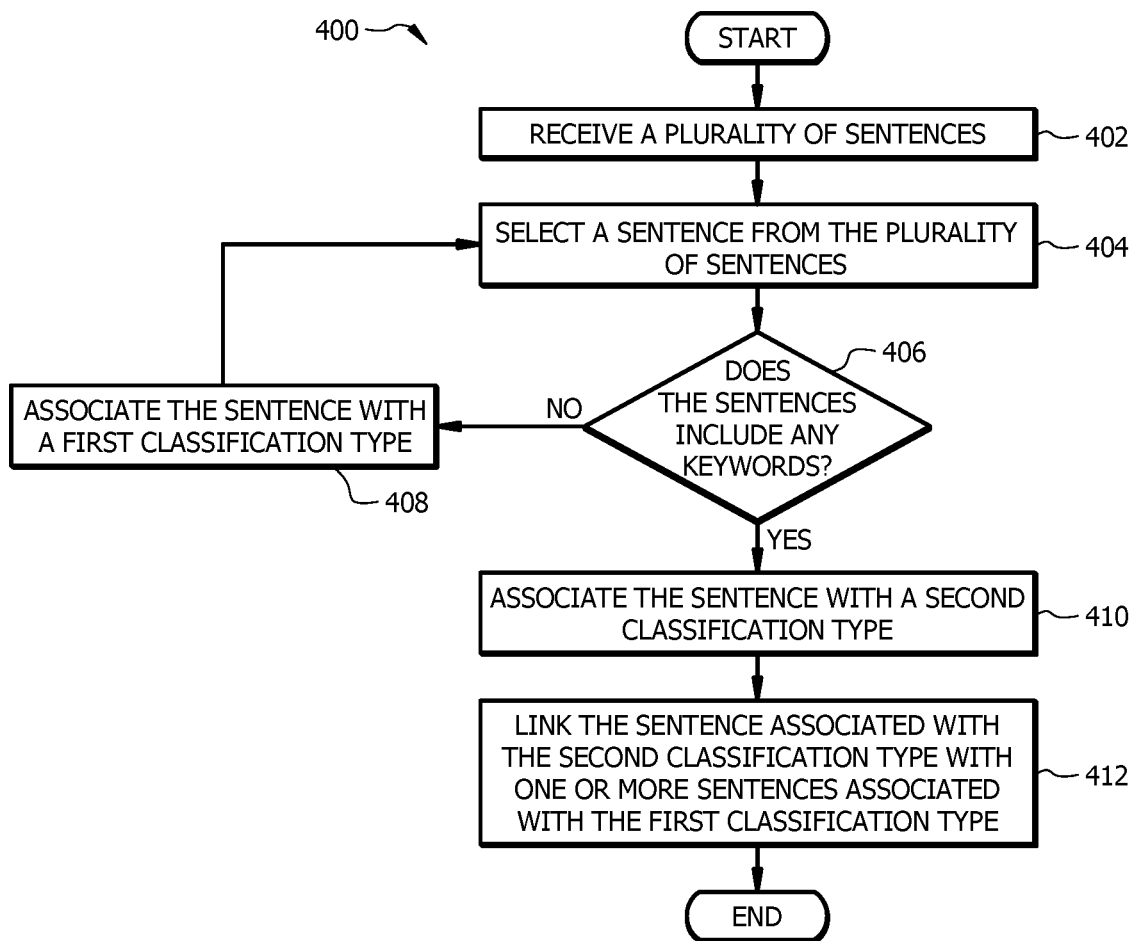
FIG. 4 is a flowchart of an embodiment of a sentence grouping method.

FIG. 4 is a flowchart of an embodiment of a sentence grouping method 400. The EDIE 106 may employ method 400 to identify sentence classification types based on the text within the sentences and to group together sentences based on their classification types. This process allows the EDIE 106 to aggregate different types of sentences together to more accurately represent the context of a sentence. For example, the EDIE 106 may group together one or more explanatory sentences with an actionable sentence. In this example, grouping these sentences together provides context for the actionable sentence. This process allows the EDIE 106 to generate new paragraphs using related sentences.

At step 402, the EDIE 106 receives a plurality of sentences. In one embodiment, the EDIE 106 may obtain the plurality of sentences using a process similar to the process described in FIG. 2. For example, the EDIE 106 may identify and extract the plurality of sentences from one of the logical sections 306 of a document 114. In this example, the plurality of sentences may each be associated with a location identifier 308 that indicates the location of each sentence within the document 114. In another embodiment, the plurality of sentences may be provided by a user device 104 to the EDIE 106. In another embodiment, the EDIE 106 may obtain the plurality of sentences from a memory (e.g. memory 1304). In other embodiments, the EDIE 106 may receive the plurality of sentences from any other suitable source.

At step 404, the EDIE 106 selects a sentence from the plurality of sentences. The EDIE 106 may be configured to sequentially select sentences from the plurality of sentences in the order that they appear within a document 114. At step 406, the EDIE 106 determines whether the selected sentence includes any predefined keywords 112. The keywords 112 comprises a set of words that can be used to determine the classification type for the selected sentence. For example, the keyword 112 may comprise a set of words that can be used to determine whether a sentence is an actionable sentence. In this example, the keywords 112 may comprise model verbs or actions. Examples of modal words or verbs include, but are not limited to, "can," "could," "may," "might," "must," "shall," "should," "will," "need," and "would." In other examples, the keywords 112 may comprise any other types of words that can be used to determine a sentence classification type. Examples of classification types include, but are not limited to, explanatory statements, actionable statements, restricted information, classified information, financial information, account information, speculative or predictive sentences, definitive sentences, factual sentences, opinion sentences, past tense sentences, present tense sentences, future tense sentences, contextual sentences, or any other suitable classification types. The EDIE 106 may scan the selected sentence to identify the words within the selected sentence and compare the identified words to a set of keywords 112. The EDIE 106 proceeds to step 408 in response to determining that the selected sentence does not contain any keywords 112.

At step 408, the EDIE 106 associates the selected sentence with a first classification type. In this case, the EDIE 106 determines that the selected sentence is associated with the first classification type based on the absence of any keywords 112 in the selected sentence. Continuing with the previous example, the selected sentence may state "this room is full of hazards." In this example, the selected sentence does not contain any of the keywords 112 because it is an explanatory statement that provides context information. In this case, the EDIE 106 may associate the selected sentence with a classification type that indicates that the selected sentence is an explanatory sentence in response to determining that the selected sentence does not contain any keywords 112 that correspond with modal verbs or actions.

In other examples, the EDIE 106 may associate the selected sentence with any other suitable classification type. For example, the EDIE 106 may associate the selected sentence with a classification type that corresponds with general sentences, factual sentences, speculative sentences, or any other type of sentence. After the EDIE 106 associates the selected sentence with the first classification type, the EDIE 106 returns to step 404 to classify other sentences. The EDIE 106 may repeat this process to associate any suitable number of sentences with the first classification type.

Returning to step 406, the EDIE 106 proceeds to step 410 in response to determining that the selected sentence contains one or more keywords 112. At step 410, the EDIE 106 associates the selected sentence with a second classification type. In this case, the EDIE 106 determines that the selected sentence is associated with the second classification type based on the presence of one or more keywords 112 in the selected sentence. Continuing with the previous example, the selected sentence may state "you need to wear a hard hat." In this example, the selected sentence contains a keyword 112 (e.g. "need") because it is an actionable statement that identifies an action (i.e. wearing a helmet) to be performed. In this case, the EDIE 106 determines that the selected sentence contains one or more modal verbs or actions and associates the selected sentence with a classification type that indicates that the selected sentence is an actionable sentence.

At step 412, the EDIE 106 links the sentence that is associated with the second classification type with one or more sentences that are associated with the first classification type. Here, the EDIE 106 generates a new body of text (e.g. a paragraph) that comprises the sentences that are associated with the first classification type and the sentence that is associated with the second classification type. Continuing with the previous example, the EDIE 106 may associate one or more sentences that are associated with an explanatory sentence classification type with the sentence that is associated with an actionable sentence classification type. In this example, grouping the explanatory sentences together with the actionable sentence generates a new paragraph that provides context for the actionable sentence.

In one embodiment, the EDIE 106 may be configured to only link sentences that are associated with the second classification type to other sentences that precede it. For example, the EDIE 106 may not link the sentence that is associated with the second classification type with other sentences that appear after the sentence in the document 114. In other words, the EDIE 106 may only link the sentence that is associated with the second classification type with other sentences that appear before the sentence in the document 114. As an example, contextual information generally appears before an actionable statement in a document 114. Using this structure allows the EDIE 106 to more accurately group together sentences from a document 114.

In one embodiment, the EDIE 106 may employ a machine learning model 108 for determining classification types for sentences. For example, the EDIE 106 may input one or more sentences from the plurality of sentences that do not contain any of the keywords 112 into a machine learning model 108. In this example, the machine learning model 108 has been previously trained to map sentences to classification types. During the machine learning model training process, the weights, biases, and other parameters of the machine learning model 108 function are adjusted to generate a mapping between an input sentence and a particular classification type. An example of this process is described in FIG. 9. The machine learning model 108 may be configured to classify a sentence based on the verbs or modal terms used in the sentence, verb tenses, grammatical structure, the content or subject matter of the sentence, or any other characteristics or combination of characteristics of the input sentence. Here, the EDIE 106 sends a sentence to the machine learning model 108 as an input and receives a corresponding classification type in response to providing the input sentence. The EDIE 106 may repeat this process for any number of sentences to obtain classification types for each of the sentences. The EDIE 106 is configured to associate the one or more sentences with a classification type based on a set of classification types that are provided by the machine learning model 108. For instance, the EDIE 106 may associate one or more sentences with the first classification type and a sentence with the second classification type based on the output provided by the machine learning model 108. In this example, the EDIE 106 may link the one or more sentences associated with the first classification type with the sentence that is associated with the second classification type using a process similar to the process described in step 412.

Sentence Mapping to a Classification Description

Figure 5:
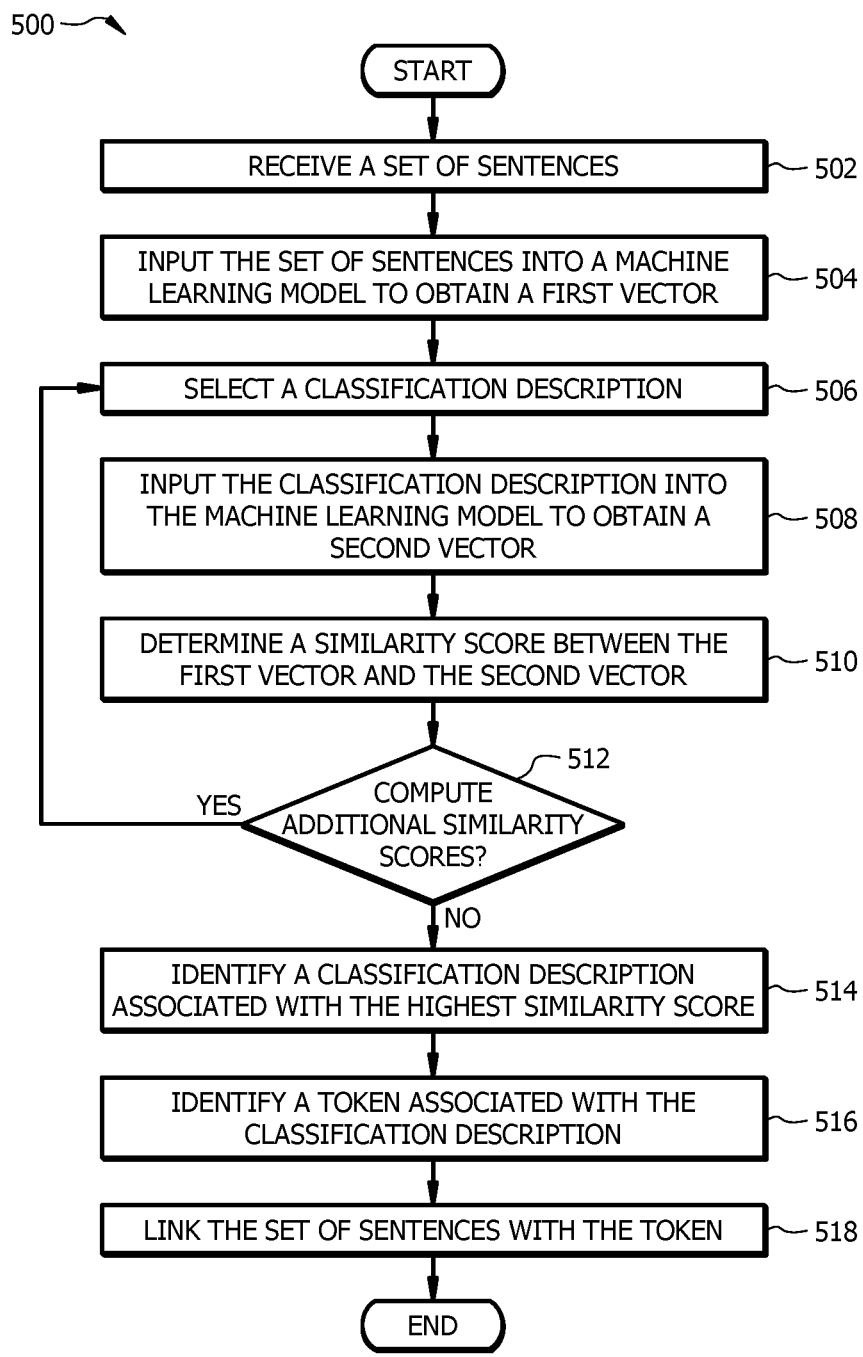
FIG. 5 is a flowchart of an embodiment of a sentence mapping method.

FIG. 5 is a flowchart of an embodiment of a sentence mapping method 500. The EDIE 106 may employ method 500 to identify relationships between sentences to classification descriptions 110. A classification description 110 comprises text that is associated with a document 114. For example, a classification description 110 may comprise text from a document, a description of a document, a description of a document purpose, a summary of a document, a summary of action items from a document, a description of governing practices identified by a document, or any other kind of text description associated with a document 114. For instance, a classification description 110 may be associated with an actionable item within a document 114. In one embodiment, classification descriptions 110 may be user-defined or based on predefined descriptions. For example, classification descriptions 110 may comprise predefined text from COBIT5, NIST, or any other organization. In some embodiments, a classification description 110 may comprise multiple levels of text descriptions. Each level of text description may provide additional information that can be used for mapping and classifying sentences. For example, a classification description 110 may comprise a first description level that generally describes a document 114 and a second description level that uniquely describes content within the document 114.

Each classification description 110 is linked with a unique identifier or token 602. For example, a classification description 110 may be linked with an alphanumeric value that can be used to reference or identify the classification description 110. Mapping sentences to a classification description 110 may comprise linking the sentences from a document 114 with the token 602 of the classification description 110. The token can be used to identify other documents 114 with the same token 602. For instance, policies with similar requirements may be associated with the same token 602. Referring to FIG. 6 as an example, each row corresponds with a classification description 110. In this example, each classification description 110 comprises two levels of description. In other examples, a classification description 110 may comprise any other suitable number of description levels. Each description level may have a different level of scope or specificity for a document 114. For example, the text description in a set of description levels may range from general to specific with respect to a document 114. In addition, each classification description 110 is linked with a unique token 602.

Returning to FIG. 5, the EDIE 106 is configured to determine which classification descriptions 110 best align with a set of sentences. For example, the EDIE 106 may compare sentences from a new regulation to identify other regulations that the sentences are similar to. Unlike conventional techniques which typically use whole documents as inputs, the EDIE 106 is configured to use specific portions (e.g. sentences) from a document 114 and classification descriptions 110 which provides higher accuracy when mapping sentences to classification descriptions 110.

At step 502, the EDIE 106 receives a set of input sentences. In one embodiment, the EDIE 106 may obtain the set of sentences using a process similar to the process described in FIG. 2. For example, the EDIE 106 may identify and extract the set of sentences from one of the logical sections 306 of a document 114. In this example, the set of sentences may each be associated with a location identifier 308 that indicates the location of each sentence within the document 114. In another embodiment, the EDIE 106 may obtain the set of sentences using a process similar to the process described in FIG. 4. For example, the set of sentences may comprise one or more sentences that are linked with a first classification type and a sentence that is linked with a second classification type. In another embodiment, the set of sentences may be provided by a user device 104 to the EDIE 106. In another embodiment, the EDIE 106 may obtain the set of sentences from a memory (e.g. memory 1304). In other embodiments, the EDIE 106 may receive the set of sentences from any other suitable source.

At step 504, the EDIE 106 inputs the set of input sentences into a machine learning model 108 to obtain a first vector. In this example, the machine learning model 108 has been previously trained to maps sentences to a numeric vector. During the machine learning model training process, the weights, biases, and other parameters of the machine learning model 108 function are adjusted to generate a mapping between an input sentence and a particular vector in a vector space. Here, the EDIE 106 sends the set of input sentences to the machine learning model 108 as an input and receives a first vector in response to providing the set of input sentences. The machine learning model 108 determines a first vector that maps to the text from the set of input sentences. The first vector is a numeric value that uniquely represents the input sentences. For example, the first vector may comprise a first set of numeric values that correspond with a first location in a vector space. In some embodiments, the EDIE 106 may use techniques such as word2vec, doc2vec, or any other suitable technique for mapping the set of input sentences into vectors as would be appreciated by one of ordinary skill in the art.

At step 506, the EDIE 106 selects a classification description 110. In one embodiment, the EDIE 106 is configured to select a classification description 110 from among a set of classification descriptions 110 that are stored in memory (e.g. memory 1304).

At step 508, the EDIE 106 inputs the classification description 110 into the machine learning model 108 to obtain a second vector. Here, the EDIE 106 may send the text from the classification description 110 to the machine learning model 108 as an input and receives a second vector in response to providing the classification description 110. The machine learning model 108 determines a second vector that maps to the text from the selected classification description 110. For example, the second vector may comprise a second set of numeric values that correspond with a second location in the vector space.

In one embodiment, the EDIE 106 may be configured to input one or more description levels for a classification description 110 into the machine learning model 108 to obtain the second vector. For example, each classification description 110 may comprises multiple description levels that provide different types of text descriptions. Referring to FIG. 6 as an example, the EDIE 106 may be configured to use the text from a second description level 604 of a classification identifier 110 as the input to the machine learning model 108 to obtain the second vector. In other examples, the EDIE 106 may be configured to use text from a first description level 606 or a combination of text from both the first description level 606 and the second description level 604 as inputs to the machine learning model 108 to obtain the second vector.

Returning to FIG. 5 at step 510, the EDIE 106 determines a similarity score between the first vector and the second vector. The similarity score is a numeric value that indicates how similar the set of input sentences and the classification description 110 are to each other. For example, the similarity score may be a value between zero and one. For instance, the similarity score may be equal to one when the first vector and the second vector are the same as each other. The similarity score may be equal to zero when the first vector and the second vector are very difference from each other. In one embodiment, the similarity score may correspond with an angle (e.g. a cosine angle) between the first vector and the second vector. In this example, the similarity score may be computed by dividing a dot product of the first vector and the second vector by a dot product of a magnitude of the first vector and a magnitude of the second vector. In other examples, the EDIE 106 may determine the similarity score between the first vector and the second vector using any suitable technique.

In one embodiment, the determining the similarity score between the first vector and the second vector may comprise determining a first similarity score based on text from a first description level for the classification description 110 and determining a second similarity score based on text from a second description level for the classification description 110. Referring to FIG. 6 as an example, the EDIE 106 may identify a vector for the text in the first description level 606 and another vector for the text in the second description level 604. In this example, the EDIE 106 may determine a first similarity score between the first vector and the vector for the text in the first description level 606. The EDIE 106 may also determine a second similarity score between the first vector and the vector for the text in the second description level 604. The EDIE 106 may then add the first similarity score and the second similarity score together to determine an overall similarity score for the classification description 110. The EDIE 106 may perform this process for any suitable number of description levels for a classification description.

Returning to FIG. 5 at step 512, the EDIE 106 determines whether to compute additional similarity scores between the set of input sentences and other classification descriptions 110. For example, the EDIE 106 may determine whether the set of input sentences have been compared to all the classification descriptions 110 within a set of classification descriptions 110. In this example, the EDIE 106 may determine to compute additional similarity scores when at least one of the classification descriptions 110 from the set of classification descriptions 110 has not been compared to the set of input sentences. The EDIE 106 may determine to not compute any additional similarity scores when there are no more classification descriptions 110 to compare to the set of input sentences. The EDIE 106 returns to step 506 in response to determining to compute additional similarity scores. Otherwise, the EDIE 106 proceeds to step 514 in response to determining not to compute additional similarity scores.

In one embodiment, the EDIE 106 is further configured to filter out one or more similarity scores. For example, the EDIE 106 may be configured to determine a standard deviation for a set of similarity scores and to compare the standard deviation to a predetermined threshold value. As an example, the predetermined threshold value may be a multiple of the standard deviation. For instance, the predetermined threshold may be set to one, two, three, or any other suitable number times the standard deviation of the of the set of similarity scores. As another example, the predetermined threshold value may be any other suitable numeric value. The EDIE 106 may discard any similarity scores from the set of similarity scores that are less than the predetermined threshold value.

At step 514, the EDIE 106 identifies a classification description 110 that is associated with the highest similarity score. In other words, the EDIE 106 identifies which classification description 110 best matches the set of input sentences based on its similarity score. The EDIE 106 may determine which classification description 110 best matches or aligns with a set of sentences based on rankings (e.g. top five), standard deviations, upper/lower thresholds, weighted scoring, any other suitable metric, or combination thereof. For instance, the EDIE 106 may identify the top five classification description 110 based on their similarity scores. After identifying the top five classification descriptions 110, the EDIE 106 may repeat the process of computing similarity scores and to determine a top classification description 110 from among the top five classification descriptions 110. For example, the EDIE 106 may determine new similarity scores based on only a portion of a classification description 110 (e.g. a second description level 604). Repeating this process one or more times may improve the accuracy of finding a classification description 110 that best matches a set of sentences.

At step 516, the EDIE 106 identifies a token 602 that is associated with the identified classification description 110. A token 602 is a unique alphanumeric value that can be used to reference or identify a particular classification description 110. Here, the EDIE 106 identifies which token 602 is associated with the classification description 110 that corresponds with the highest similarity score. Returning to the example in FIG. 6, each classification description 110 is linked with a token 602. In one example, the EDIE 106 may determine that the classification description 110A best matches the set of input sentences based on its similarity score. In this case, the EDIE 106 will identify the token 602 with a value of "APO10" which corresponds with the classification description 110A.

Returning to FIG. 5 at step 518, the EDIE 106 links the set of input sentences with the identified token 602. Here, the EDIE 106 associates the set of input sentence with the token 602 to indicate which classification description 110 is best matches the set of input sentences. In one embodiment, the EDIE 106 may output the token 602 that is associated with the classification description 110 that has the highest similarity score. For example, the EDIE 106 may output the token 602 on graphical user interface to indicate which classification description 110 best matches the set of input sentences.

Document Mapping

Figure 7:
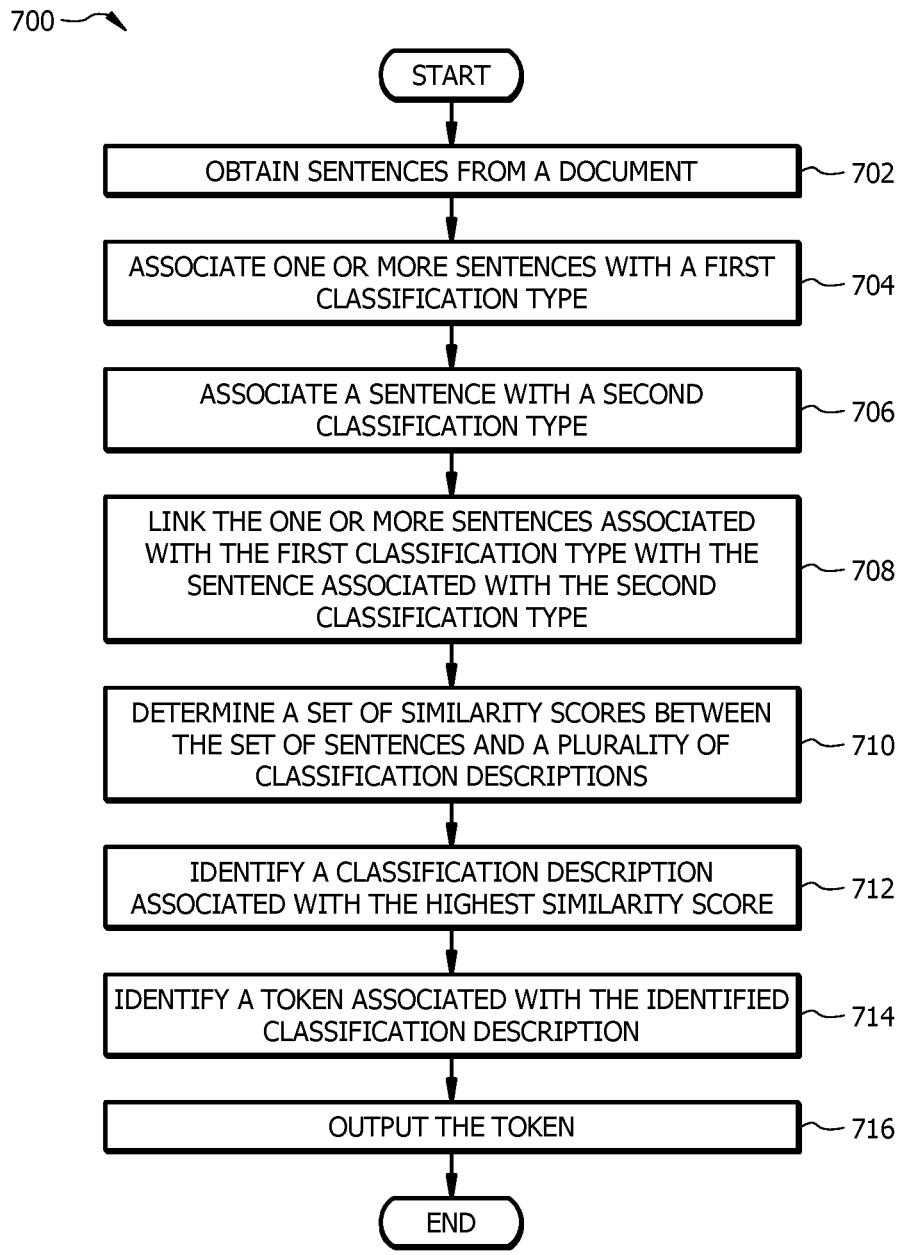
FIG. 7 is a flowchart of an embodiment of a document mapping method.

FIG. 7 is a flowchart of an embodiment of a document mapping method 700. The EDIE 106 may employ method 700 to compare portions of a document 114 to portions of other previously stored documents 114. The EDIE 106 may employ method 700 to provide an end-to-end process from ingesting a document 114 to identify text from within the document 114 to mapping its text to text from other documents 114. This process allows the EDIE 106 to determine how text from a document 114 aligns or corresponds with text from other stored documents 114. For example, the EDIE 106 may be configured to compare requirements from a new regulation to requirements from other previously stored regulations.

Figure 8:
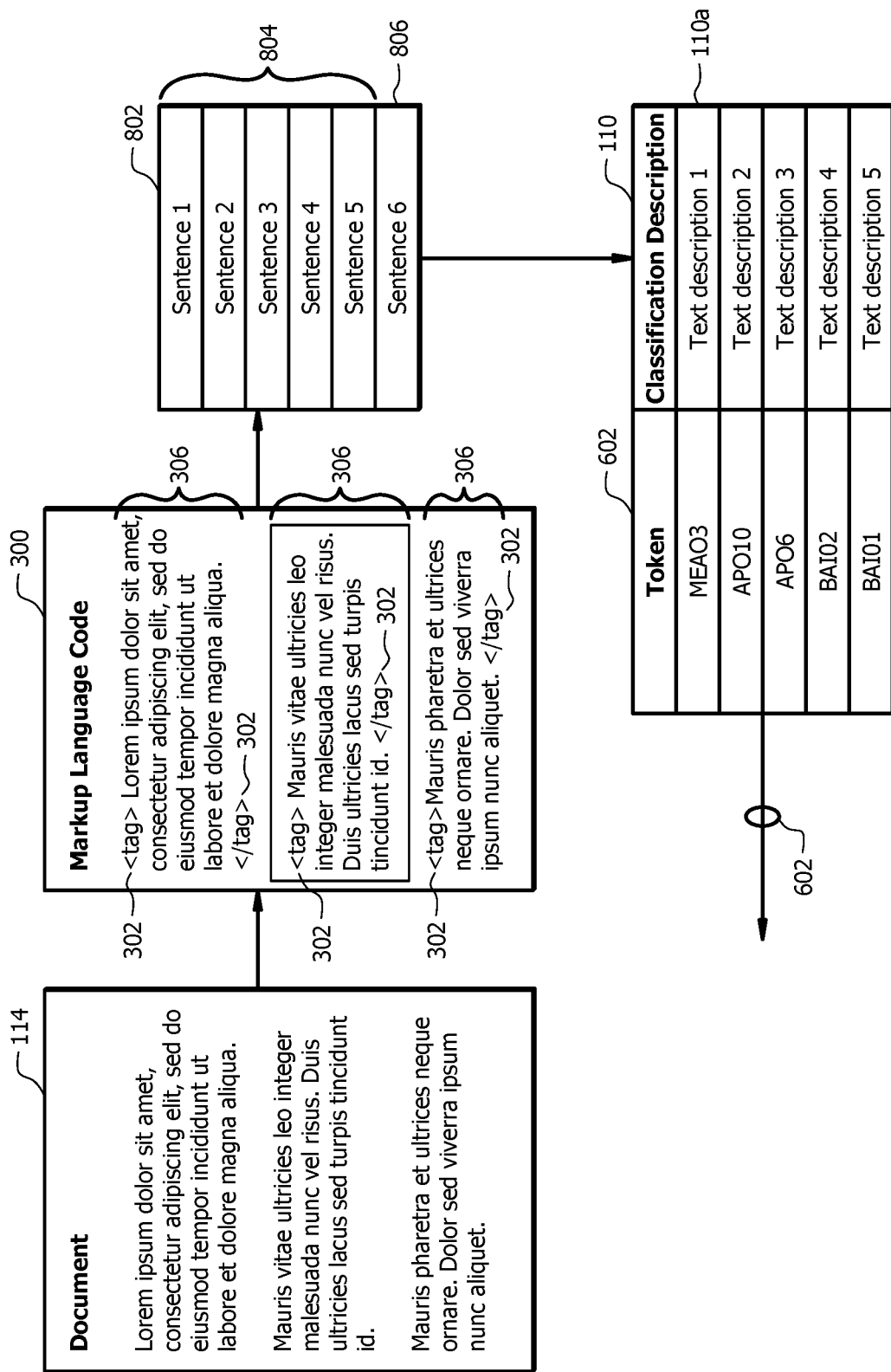
FIG. 8 is an example of a document mapping process.

At step 702, the EDIE 106 obtains sentences from a document 114. Referring to FIG. 8 as an example, the EDIE 106 may convert a document 114 into markup language code 300 that includes a plurality of tags 302. The EDIE 106 may convert the document 114 into markup language code 300 using a process similar to the process described in step 204 of FIG. 2. The EDIE 106 may use the plurality of tags 302 to identify and extract sentences from one of the logical sections 306 of the document 114. The EDIE 106 may identify logical sections 306 and extract sentences from a logical section 306 using a process similar to the process described in step 206-210 of FIG. 2. In this example, the sentences are each associated with a location identifier 308 that indicates the location of each sentence within the document 114.

Returning to FIG. 7 at step 704, the EDIE 106 associates one or more sentences from the document 114 with a first classification type. In one embodiment, the EDIE 106 may associate the one or more sentences with a first classification type using a process similar to the process described in step 408 of FIG. 4. For example, the EDIE 106 may compare the words in a sentence to a set of predefined keywords 112 and may associate the sentence with a first classification type in response to determining that the sentence does not include any of the keywords 112. As another example, the EDIE 106 may input a sentence into a machine learning model 108 and may associate the sentence with the first classification type based on an output from the machine learning model 108. Returning to the example in FIG. 8, the EDIE 106 may obtain a set of sentences from a logical section 306 of the markup language code 300. In this example, the EDIE 106 may associate "sentence 1," "sentence 2," "sentence 3," "sentence 4," and "sentence 5" with a first classification identifier 804. For instance, the EDIE 106 may associate "sentence 1," "sentence 2," "sentence 3," "sentence 4," and "sentence 5" with a classification identifier 804 that indicates that these sentences are explanatory sentences.

Returning to FIG. 7 at step 706, the EDIE 106 associates a sentence with a second classification type. In one embodiment, the EDIE 106 may associate the sentence with a second classification type using a process similar to the process described in 410 of FIG. 4. For example, the EDIE 106 may compare the words in a sentence to a set of predefined keywords 112 and may associate the sentence with a second classification type in response to determining that the sentence includes one or more of the keywords 112. As another example, the EDIE 106 may input a sentence into a machine learning model 108 and may associate the sentence with the second classification type based on an output from the machine learning model 108. Returning to the example in FIG. 8, the EDIE 106 mat associate "sentence 6" with a classification identifier 806 that indicates that this sentence is an actionable sentence.

Returning to FIG. 7 at step 708, the EDIE 106 links one or more sentences that are associated with the first classification type with the sentence that is associated with the second classification type to generate a set of sentences. In one embodiment, the EDIE 106 may link the one or more sentences that are associated with the first classification type with the sentence that is linked with the second classification type using a process similar to the process described in step 412 of FIG. 4. Returning to the example in FIG. 8, the EDIE 106 may aggregate "sentence 1," "sentence 2," "sentence 3," "sentence 4," "sentence 5," and "sentence 6" to generate the set of sentences 802. Here, the EDIE 106 generates a new body of text (e.g. a paragraph) that can be compared to text (e.g. classification descriptions 110) associated with other documents 114.

Returning to FIG. 7 at step 710, the EDIE 106 determines a set of similarity scores between the set of sentences and a plurality of classification descriptions 110. In one embodiment, the EDIE 106 may determine the set of similarity scores using a process similar to the process described in steps 506-512 of FIG. 5. For example, the EDIE 106 may determine a first vector for the set of sentences and a second vector for each of the classification descriptions 110. The EDIE 106 may then determine a similarity score between the first vector and the second vector for each of the classification descriptions 110.

At step 712, the EDIE 106 identifies a classification description 110 that is associated with the highest similarity score. For example, the EDIE 106 may identify a classification description 110 using a process similar to the process described in step 514 of FIG. 5. Here, the EDIE 106 identifies which classification description 110 best matches the set of input sentences based on its similarity score. At step 714, the EDIE 106 identifies a token 602 that is associated with the identified classification description 110. In one embodiment, the EDIE 106 may identify a token 602 using a process similar to the process described in step 516 of FIG. 5. Returning to the example in FIG. 8, the EDIE 106 may determine that the classification description 110A best matches the set of sentences 802 based on its similarity score. In this case, the EDIE 106 will identify the token 602 with a value of "MEA03" which corresponds with the classification description 110A.

Returning to FIG. 7 at step 716, the EDIE 106 outputs the identified token 602. For example, the EDIE 106 may output the token 602 on graphical user interface to indicate which classification description 110 is most similar to the set of input sentences.

Sentence Mapping to a Custom Classification Description

Figure 9:
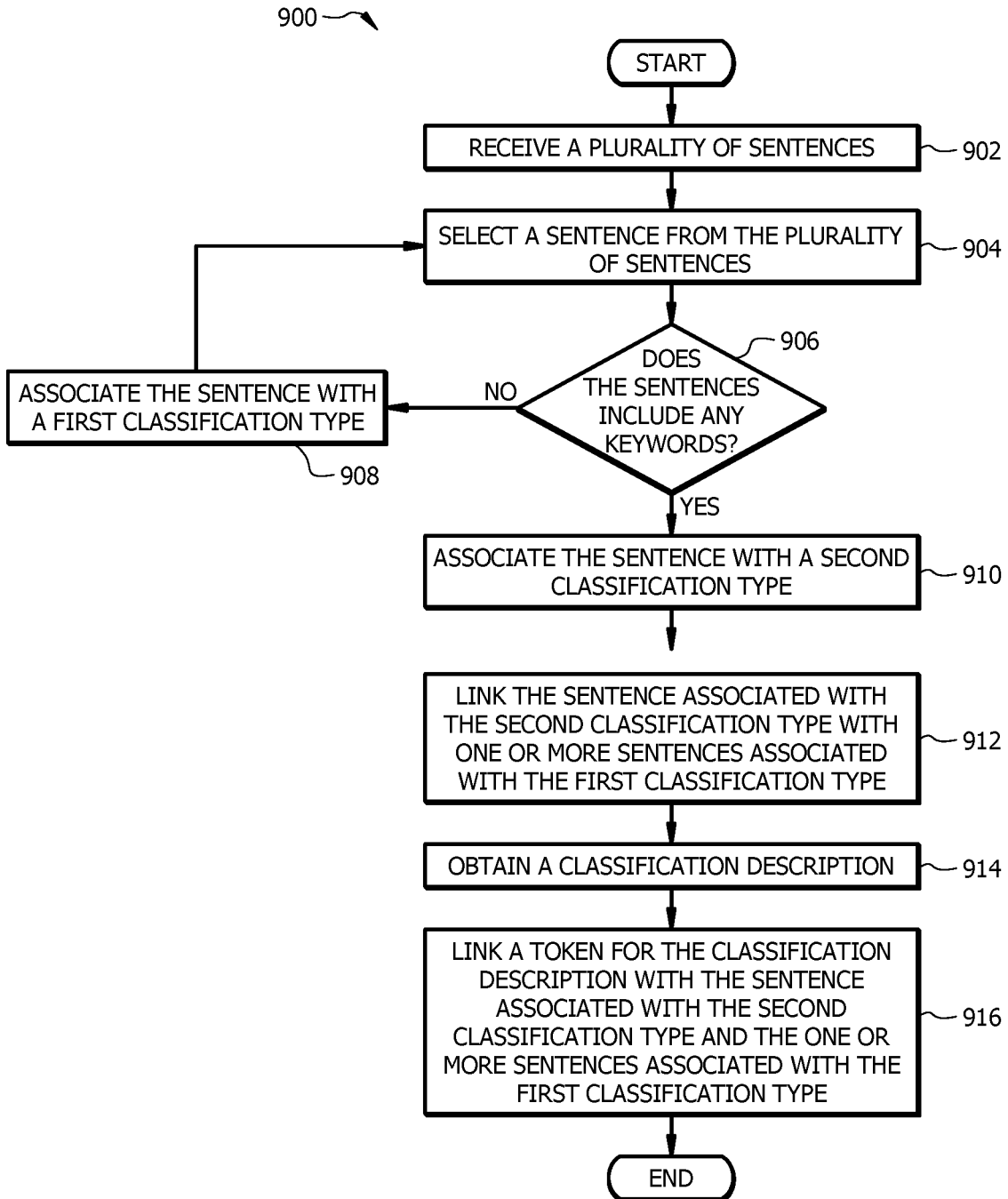
FIG. 9 is a flowchart of another embodiment of a sentence mapping method.

FIG. 9 is a flowchart of another embodiment of a sentence mapping method 900. The EDIE 106 may employ method 900 to map sentences to a custom or user-defined classification description 110. Here, the EDIE 106 may link text with new classification descriptions 110 and token 602 instead of mapping the text to classification descriptions 110 and tokens 602 for existing documents 114.

At step 902, the EDIE 106 receives a plurality of sentences. In one embodiment, the EDIE 106 may obtain the plurality of sentences using a process similar to the process described in FIG. 2. For example, the EDIE 106 may identify and extract the plurality of sentences from one of the logical sections 306 of a document 114. In this example, the plurality of sentences may each be associated with a location identifier 308 that indicates the location of each sentence within the document 114. In another embodiment, the plurality of sentences may be provided by a user device 104 to the EDIE 106. In another embodiment, the EDIE 106 may obtain the plurality of sentences from a memory (e.g. memory 1304). In other embodiments, the EDIE 106 may receive the plurality of sentences from any other suitable source.

At step 904, the EDIE 106 selects a sentence from the plurality of sentences. The EDIE 106 may be configured to sequentially select sentences from the plurality of sentences in the order that they appear within a document 114.

At step 906, the EDIE 106 determines whether the selected sentence includes any predefined keywords 112. A set of keywords 112 may comprise words associated with a particular classification type. For example, the set of keywords 112 may comprise words for identifying actionable sentences. The EDIE 106 may employ natural language processing to scan the selected sentence to identify the words within the selected sentence and to compare the identified words to the set of keywords 112. The EDIE 106 proceeds to step 908 in response to determining that the selected sentence does not include any of the keywords 112.

At step 908, the EDIE 106 associates the selected sentence with a first classification type. Here, the EDIE 106 determines that the selected sentence is associated with the first classification type based on the absence of any keywords 112 in the selected sentence. Continuing with the previous example, the EDIE 106 may associate the selected sentence with a classification type that indicates that the selected sentence is an explanatory sentence in response to determining that the selected sentence does not contain any keywords 112 corresponding with an actionable sentence. In other examples, the EDIE 106 may associate the selected sentence with any other suitable type of classification type. After the EDIE 106 associates the selected sentence with the first classification type, the EDIE 106 returns to step 904 to classify other sentences. The EDIE 106 may repeat this process to associate any suitable number of sentences with the first classification type.

Returning to step 906, the EDIE 106 proceeds to step 910 in response to determining that the selected sentence contains one or more keywords 112. At step 910, the EDIE 106 associates the selected sentence with a second classification type. Here, the EDIE 106 determines that the selected sentence is associated with the second classification type based on the presence of one or more keywords 112. Continuing with the previous example, the keywords 112 may comprise modal words that identify actionable sentences. In this example, the EDIE 106 associate the selected sentence with a classification type that indicates that the selected sentence is an actionable sentence that includes an action to be taken or provides instructions for performing an action.

At step 912, the EDIE 106 links the sentences that is associated with the second classification type with the one or more sentences that are associated with the first classification type. Here, the EDIE 106 generates a new body of text (e.g. a paragraph) that comprises the sentences that are associated with the first classification type and the sentence that is associated with the second classification type. Continuing with the previous example, the EDIE 106 may associate the one or more sentences that are associated with an explanatory sentence classification type with the sentence that is associated with an actionable sentence classification type. In this example, grouping the explanatory sentences together with the actionable sentence generates a new paragraph that provides context for the actionable sentence.

At step 914, the EDIE 106 obtains a classification description 110. For example, a user may provide text and a token 602 that can be used for a classification description 110 to the EDIE 106. For instance, the EDIE 106 may provide a graphical user interface that allows a user to input text via a user device 104. In this example, the user may provide a custom text description that can be used as a classification description 110. The user may provide one or more description levels for a classification description 110. The user may also define a unique token 602 to associate with the custom text description. As another example, the EDIE 106 may obtain a classification description 110 from a memory (e.g. memory 1304). For instance, the EDIE 106 may obtain a file from memory that contains one or more user-defined classification descriptions 110 and tokens 602. In other examples, the EDIE 106 may obtain a classification description 110 from any other suitable source.

At step 916, the EDIE 106 links the token 602 for the classification description 110 with the sentence that is associated with the second classification type and the one or more sentences that are associated with the first classification type. In other words, the EDIE 106 links the sentences that are associated with the first and second classification type with the classification description 110 and its token 602. This process allows the input sentences to be later referenced based on the text within the input sentence, the text within the associated classification description 110, and/or the token 602 that is associated with the input sentences.

Machine Learning Model Training

Figure 10:
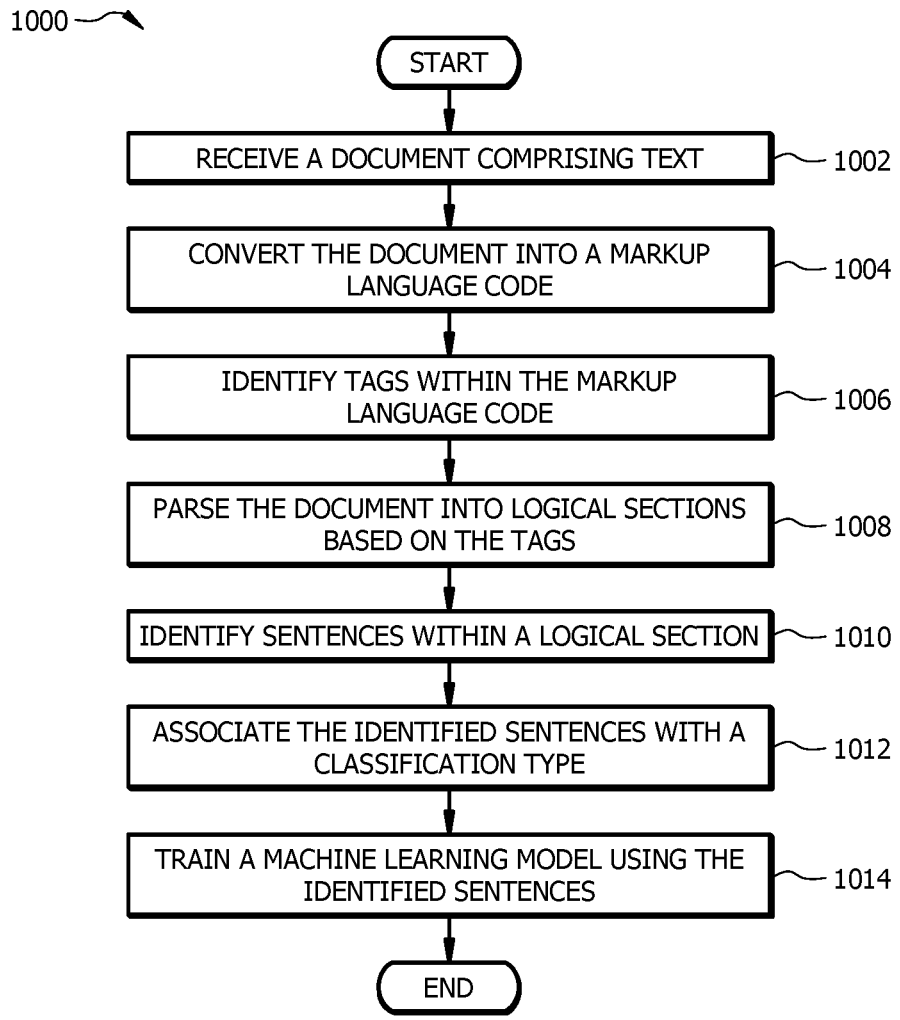
FIG. 10 is a flowchart of an embodiment of a machine learning model training method.

FIG. 10 is a flowchart of an embodiment of a machine learning model training method 1000. The EDIE 106 may employ method 1000 to generate training data for training a machine learning model 108 to classify sentences from a document 114. The training data comprises one or more sentences that are used for training machine learning models 108. This process allows the EDIE 106 to create training data that improves accuracy when training machine learning models 108 by identifying relationships between sentences. Training a machine learning model 108 using the generated training data allows the machine learning model 108 to learn the context of sentences with respect to other sentences. Existing tools typically input the entire text from a document to train a machine learning model 108. In contrast, the EDIE 106 is configured to strategically use portions (e.g. sentences from a paragraph) of a document 114 as inputs. The trained machine learning model 108 is configured to group words together from each paragraph in a vector space. This process allows each paragraph to be mapped into the vector space and associated with a unique vector. In addition, this process enables machine learning models 108 to learn more quickly and more accurately while using fewer documents 114.

At step 1002, the EDIE 106 receives a document 114 that comprises text. In one embodiment, the EDIE 106 receives the document 114 from a user device 104. For example, the EDIE 106 may provide a graphical user interface that allows the user device 104 to upload or send the document 114 to the EDIE 106 for processing. In another embodiment, the EDIE 106 receives the document 114 from a memory (e.g. memory 1304).

At step 1004, the EDIE 106 converts the document 114 into a markup language code 300. In one embodiment, the EDIE 106 may convert the document 114 into a markup language code 300 using a process similar to the process described in step 204 of FIG. 2. For example, the EDIE 106 may receive the document 114 and employ natural language processing to scan the document 114 to identify different portions (e.g. headers, titles, pages, paragraphs, and sections) of the document 114. The EDIE 106 may then associate HTML tags 302 that correspond with the different identified portions of the document 114. For example, the EDIE 106 may identify a page number within the document 114 and associate a page number HTML tag 302 with the identified page number. As another example, the EDIE 106 may identify a header and associate a header HTML tag 302 with identified header. The EDIE 106 may then generate the markup language code 300 that comprise text from the document 114 with its associated HTML tags 302.

At step 1006, the EDIE 106 identifies tags 302 within the markup language code 300. For example, the EDIE 106 may use a parser to identify tags 302 associated with pages, sections, paragraphs, or any other suitable type of tags 302. For example, the EDIE 106 may employ a parser (e.g. an HTML parser) to identify the tags 302 within the markup language code 300 based on their syntax. For example, the EDIE 106 may scan the markup language code 300 to identify characters that correspond with tags 302. For instance, the EDIE 106 may scan the markup language code 300 to identify instances of the characters '<' and '</' which indicate the presence of a tag 302.

At step 1008, the EDIE 106 parses the document 114 into logical sections 306 based on the tags 302. In one embodiment, the EDIE 106 may parse the document 114 into logical sections 306 using a process similar to the process described in step 208 of FIG. 2. The logical sections 306 may correspond with pages, sections, paragraphs, or any suitable portion of the document 114.

At step 1010, the EDIE 106 identifies sentences within a logical section 306. The EDIE 106 may employ natural language processing to identify the sentences within a logical section 306. For example, the EDIE 106 may identify a logical section 306 and then scan the text within the logical section 306 for punctuation characters. The EDIE 106 may use the identified punctuation as delimiters for identifying sentences within the logical section 306. For instance, the EDIE 106 may identify a logical section 306 that corresponds with paragraph and then scan the text within the paragraph for any punctuation characters (e.g. '.', '?', or '!'). In this example, the EDIE 106 identifies any text that precedes or is between punctuation characters as a sentence. In other examples, the EDIE 106 may employ any suitable natural language processing technique as would be appreciated by one of ordinary skill in the art.

At step 1012, the EDIE 106 associates the sentences with a classification type. Here, the EDIE 106 may associate the sentences with any suitable type of classification type. Examples of classification types include, but are not limited to, explanatory statements, actionable statements, restricted information, classified information, financial information, account information, speculative or predictive sentences, definitive sentences, factual sentences, opinion sentences, past tense sentences, present tense sentences, future tense sentences, contextual sentences, or any other suitable classification types. In one embodiment, the EDIE 106 is configured to receive a classification type from a user and to associate the sentences with the provided classification type.

At step 1014, the EDIE 106 trains a machine learning model 108 using the identified sentences. In one embodiment, the EDIE 106 is configured to convert the identified sentences into a vector before providing the sentences to the machine learning model 108. In this case, the EDIE 106 may convert the identified sentences into a vector using a process similar to the process described in step 504 of FIG. 5. The EDIE 106 may train the machine learning model 108 by performing a regression (e.g. non-linear regression) using the identified sentences. During the regression process, the EDIE 106 may adjust weights, biases, and/or any other parameters of the machine learning model 108 to generate a mapping between the input sentences and their respective classification types. In this example, the EDIE 106 trains the machine learning model 108 using supervised learning. In other examples, the EDIE 106 may train the machine learning model 108 using unsupervised learning. This process allows the EDIE 106 to improve the accuracy of the machine learning models 108 by identifying relationships between sentences. Training a machine learning model 108 using the identified sentences allows the machine learning model 108 to learn the context of sentences with respect to other related sentences.

Document Mapping Validation

Figure 11:
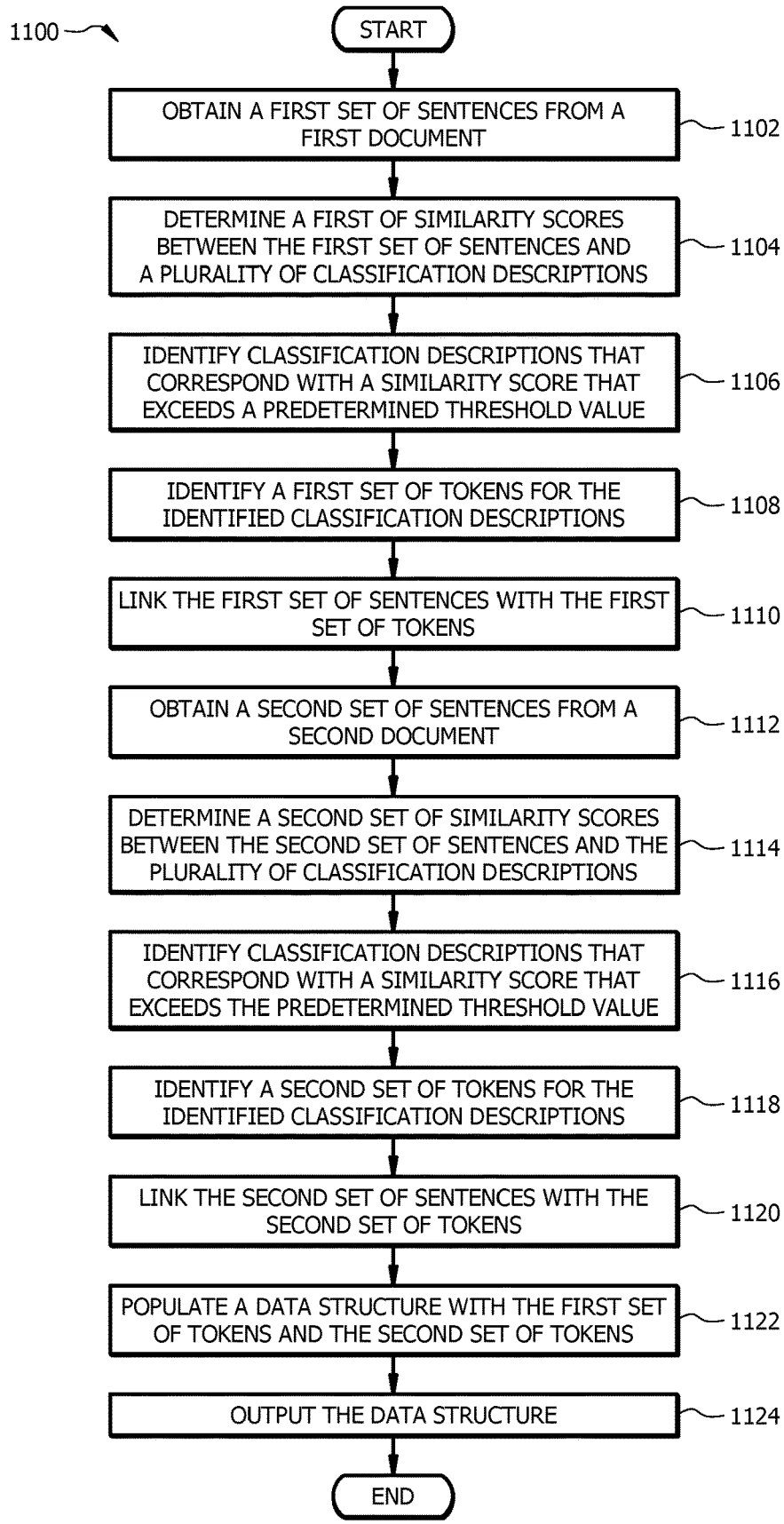
FIG. 11 is a flowchart of an embodiment of a document mapping validation method.

FIG. 11 is a flowchart of an embodiment of a document mapping validation method 1100. The EDIE 106 may employ method 1100 to determine how different documents 114 align or map to other documents 114. For example, the EDIE 106 employ method 1100 to compare the text from two documents 114 to a set of classification descriptions 110 and to determine how much of the text between each document 114 maps to the same classification descriptions 110. This process allows the EDIE 106 to identify commonalities and overlap between different documents 114.

At step 1102, the EDIE 106 obtains a first set of sentences from a first document 114. In one embodiment, the EDIE 106 may obtain the first set of sentences using a process similar to the process described in FIG. 2. For example, the EDIE 106 may identify and extract the first set of sentences from one of the logical sections 306 of a document 114. In this example, the first set of sentences may each be associated with a location identifier 308 that indicates the location of each sentence within the document 114. In another embodiment, the first set of sentences may be provided by a user device 104 to the EDIE 106. In another embodiment, the EDIE 106 may obtain the first set of sentences from a memory (e.g. memory 1304). In other embodiments, the EDIE 106 may receive the first set of sentences from any other suitable source.

At step 1104, the EDIE 106 determines a first set of similarity scores between the first set of sentences and a plurality of classification descriptions 110. In one embodiment, the EDIE 106 may determine the first set of similarity scores using a process similar to the process described in steps 504-510 of FIG. 5. For example, the EDIE 106 may obtain a first vector for the first set of sentences and a second vector for each classification description 110 from among a set of classification descriptions 110. The EDIE 106 may then compute a similarity score between the first vector and each of the second vectors. For instance, the similarity score may correspond with an angle (e.g. a cosine angle) between the first vector and a second vector. In this example, the similarity score may be computed by dividing a dot product of the first vector and the second vector by a dot product of a magnitude of the first vector and a magnitude of the second vector.

At step 1106, the EDIE 106 identifies classification descriptions 110 that correspond with a similarity score that exceeds a predetermined threshold value. The predetermined threshold value may be set to 0.7, 0.75, 0.8, 0.9, or any other suitable value. Here, the EDIE 106 compares the similarity scores from the first set of similarity scores to the predetermined threshold to identify any classification descriptions 110 that are associated with a similarity score that is greater than or equal to the predetermined threshold value.

Figure 12:
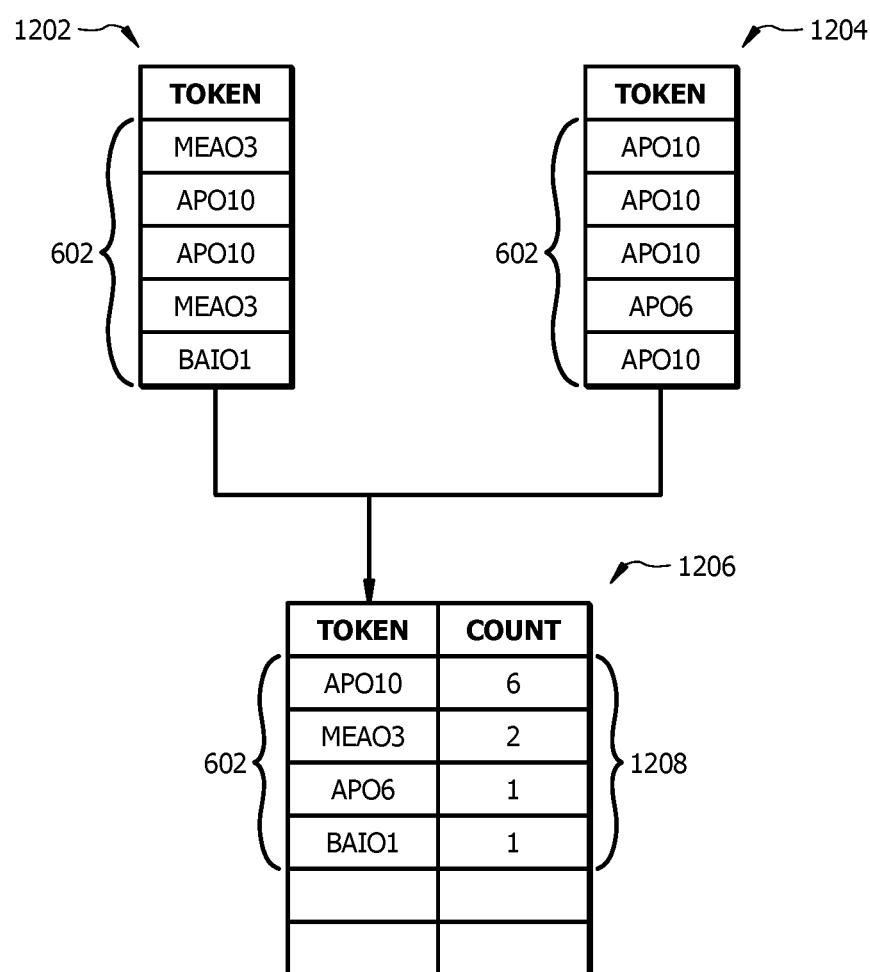
FIG. 12 is an example of document mapping validation process.

At step 1108, the EDIE 106 identifies a first set of tokens 602 that correspond with the identified classification descriptions 110. Here, the EDIE 106 identifies the tokens 602 that are linked with the classification descriptions 110 that are associated with a similarity score that is greater than or equal to the predetermined threshold value. At step 1110, the EDIE 106 links the first set of sentences with the first set of tokens 602. Here, the EDIE 106 associates the first set of input sentence with the tokens 602 to indicate which classification description 110 best match the first set of input sentences. In one embodiment, the EDIE 106 stores the first set of tokens 602 in a data structure. Examples of data structures include, but are not limited to, tables, matrices, arrays, or any other suitable type of data structure. Referring to FIG. 12 as an example, the EDIE 106 stores the first set of tokens 602 in a data structure 1202. In this example, the EDIE 106 populates the data structure 1202 to include tokens 602 with values of "MEAO3," "APO10," "APO10," "MEAO3," and "BAIO1."

Returning to FIG. 11 at step 1112, the EDIE 106 obtains a second set of sentences from a second document 114. The EDIE 106 may obtain the second set of sentences using a process similar to the process described in step 1102.

At step 1114, the EDIE 106 determines a second set of similarity scores between the second set of sentences and the plurality of classification descriptions 110. For example, the EDIE 106 may determine the second set of similarity scores using a process similar to the process described in step 1104.

At step 1116, the EDIE 106 identifies classification descriptions 110 that correspond with a similarity score that exceeds the predetermined threshold value. For example, the EDIE 106 may identify classification descriptions 110 using a process similar to the process described in step 1106.

At step 1118, the EDIE 106 identifies a second set of tokens 602 that correspond with the identified classification descriptions 110. For example, the EDIE 106 may identify the second set of tokens 602 using a process similar to the process described in step 1108.

At step 1120, the EDIE 106 links the second set of tokens 602 with the second set of sentences. For example, the EDIE 106 may link the second set of tokens 602 with the second set of sentences using a process similar to the process described in step 1110. Returning to the example in FIG. 12, the EDIE 106 may store the second set of tokens 602 in a data structure 1204. In this example, the EDIE 106 populates the data structure 1204 to include tokens 602 with values of "APO10," "APO10," "APO10," "APO6," and "APO10."

Returning to FIG. 11 at step 1122, the EDIE 106 populates a data structure with the tokens 602 from the first set of tokens 602 and the second set of tokens 602. The EDIE 106 may populate the data structure with each token 602 that appears in the first set of tokens 602 and the second set of tokens 602. For example, the EDIE 106 scan through the first set of tokens 602 and the second set of tokens 602 to identify each unique instance of a token 602. In addition, the EDIE 106 may count the number of instances that a token 602 appears within the first set of tokens 602 and the second set of tokens 602 and may populate the data structure to indicate the number of times that each token 602 appears. Here, the EDIE 106 may scan through the first set of tokens 602 and the second set of tokens 602 to count the number of times each token 602 appears.

Returning to the example in FIG. 12, the EDIE 106 populates a data structure 1206 with the identifiers from the first set of tokens 602 from the data structure 1202 and the second set of tokens 602 from the data structure 1204. In this example, the EDIE 106 populates the data structure 1206 to include tokens 602 with the values of "APO10," "MEAO3," "APO6," and "BAIO1." The EDIE 106 also populates the data structure 1206 to indicate the number of times that each token 602 appears within the first set of tokens 602 and the second set of tokens 602. In this example, the EDIE 106 populates the data structure 1206 to indicate that "APO10" appears six times, "MEAO3" appears two times, "APO6" appears once, and "BAIO1" appears once.

Returning to FIG. 11 at step 1124, the EDIE 106 outputs the data structure 1206. For example, the EDIE 106 may output the data structure 1206 on graphical user interface to indicate which classification description 110 are common between the first set of sentences in the first document 114 and the second set of sentences in the second document 114 based in their tokens 602. The provided data structure 1206 allows a user to quickly identify any overlap or gaps between documents 114.

Network Device Hardware Configuration

Figure 13:
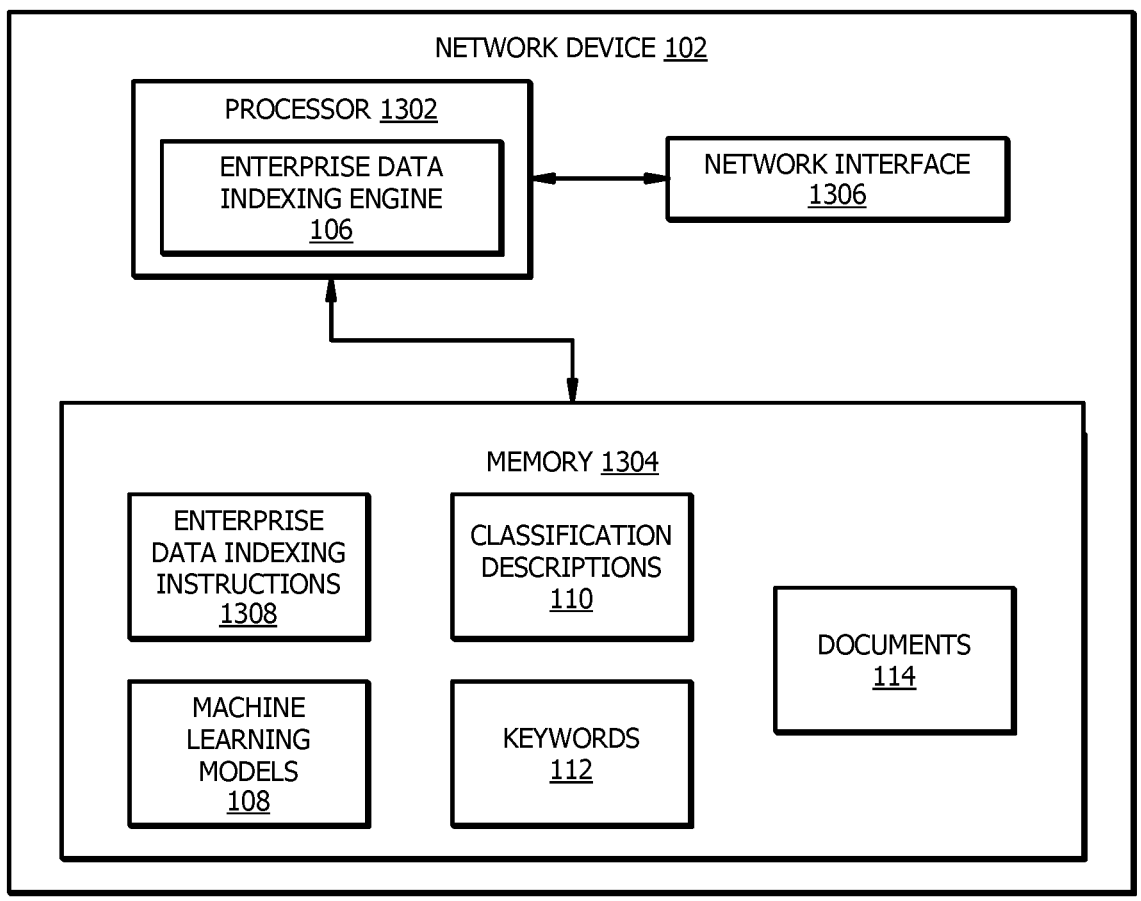
FIG. 13 is an embodiment of a device configured to analyze documents using machine learning.

FIG. 13 is an embodiment of a device (e.g. network device 102) configured to analyze documents 114 using machine learning. The network device 102 comprises a processor 1302, a memory 1304, and a network interface 1306. The network device 102 may be configured as shown or in any other suitable configuration.

The processor 1302 comprises one or more processors operably coupled to the memory 1304. The processor 1302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 1302 may be a programmable logic device, a microcontroller, a microprocessor, or any suitable combination of the preceding. The processor 1302 is communicatively coupled to and in signal communication with the memory 1304. The one or more processors are configured to process data and may be implemented in hardware or software. For example, the processor 1302 may be 8-bit, 16-bit, 32-bit, 64-bit or of any other suitable architecture. The processor 1302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement an EDIE 106. In this way, processor 1302 may be a special purpose computer designed to implement the functions disclosed herein. In an embodiment, the EDIE 106 is implemented using logic units, FPGAs, ASICs, DSPs, or any other suitable hardware. The EDIE 106 is configured operate as described in FIGS. 1-12. For example, the EDIE 106 may be configured to perform the steps of method 200, 400, 500, 700, 900, 1000. and 1100 as described in FIGS. 2, 4, 5, 7, 9, 10 and 11, respectively.

The memory 1304 comprises one or more disks, tape drives, or solid-state drives, and may be used as an over-flow data storage device, to store programs when such programs are selected for execution, and to store instructions and data that are read during program execution. The memory 1304 may be volatile or non-volatile and may comprise read-only memory (ROM), random-access memory (RAM), ternary content-addressable memory (TCAM), dynamic random-access memory (DRAM), and static random-access memory (SRAM).

The memory 1304 is operable to store enterprise data indexing instructions 1208, machine learning models 108, classification descriptions 110, keywords 112, documents 114, and/or any other data or instructions. The enterprise data indexing instructions 1208 may comprise any suitable set of instructions, logic, rules, or code operable to execute the EDIE 106. The machine learning models 108, classification descriptions 110, keywords 112, and documents 114 are configured similar to the machine learning models 108, classification descriptions 110, keywords 112, and documents 114 described in FIGS. 1-12, respectively.

The network interface 1306 is configured to enable wired and/or wireless communications. The network interface 1306 is configured to communicate data between the network device 102 and other devices (e.g. user devices 104), systems, or domain. For example, the network interface 1306 may comprise a WIFI interface, a LAN interface, a WAN interface, a modem, a switch, or a router. The processor 1302 is configured to send and receive data using the network interface 1306. The network interface 1306 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A device, comprising:
a memory operable to store a set of keywords, wherein each keyword is associated with an action; and
an enterprise data indexing engine implemented by a processor, configured to:
   obtain a plurality of sentences from a document;
   compare words in each of the plurality of sentences to the set of keywords;
   identify one or more sentences from the plurality of sentences that do not contain any of the keywords;
   associate the one or more sentences that do not contain any of the keywords with a first classification type, wherein the first classification type comprises an explanatory sentence that provides context information;
   identify a sentence from the plurality of sentences that contains one or more keywords, wherein the sentence is identified after associating the one or more sentences with the first classification type;
   associate the sentence that contains one or more keywords with a second classification type, wherein the second classification type comprises an actionable sentence;
   link the sentence associated with the second classification type with the one or more sentences associated with the first classification type to generate a set of sentences that comprise one or more sentences that are associated with the first classification type and the sentence that is associated with the second classification type, wherein the set of sentences groups the one or more explanatory sentence with the actionable sentence to provide context for the actionable sentence;
   obtain a classification description, wherein:
      the classification description comprises text associated with a document; and
      the classification description is linked with a token that references a classification description; and
   link the token with the set of sentences that comprise the sentence associated with the second classification type and the one or more sentences associated with the first classification type.

2. The device of claim 1, wherein obtaining the plurality of sentence from the document comprises:
receiving the document;
converting the document into a markup language code;
identifying a plurality of tags within the markup language code, wherein the plurality of tags demarcate portions of the markup language code;
parsing the document into one or more logical sections based on the plurality of tags, wherein a logical section comprises a portion of the text from the document; and
identifying the plurality of sentences within the one or more logical sections.

3. The device of claim 2, wherein parsing the document into the one or more logical sections comprises:
identifying a first tag associated with a first page number;
identifying a second tag associated with a second page number; and
associating text within the markup language code between the first tag and the second tag as a logical section corresponding with a page of the document.

4. The device of claim 2, wherein parsing the document into the one or more logical sections comprises:
identifying a first tag associated with a first font change;
identifying a second tag associated with a second font change; and
associating text within the markup language code between the first tag and the second tag with a logical section corresponding with a section of the document.

5. The device of claim 2, wherein parsing the document into the one or more logical sections comprises:
identifying a first paragraph tag;
identifying a second paragraph tag; and
associating text within the markup language code between the first paragraph tag and the second paragraph tag as a logical section corresponding with a paragraph of the document.

6. The device of claim 1, wherein the enterprise data indexing engine is further configured to link each sentence from the plurality of sentences with a location identifier that identifies a location within the document where a sentence is located.

7. The device of claim 6, wherein linking each sentence from the plurality of sentences comprises:
determining a logical section that contains a sentence;
identifying tags associated with the logical section that contains the sentence;
determining a location identifier based on the tags associated with the logical section that contains the sentence; and
linking the sentence with the location identifier.

8. A sentence mapping method, comprising:
obtaining a plurality of sentences from a document;
comparing words in each of the plurality of sentences to a set of predefined keywords, wherein each keyword is associated with an action;
identifying one or more sentences from the plurality of sentences that do not contain any of the keywords;
associating the one or more sentences that do not contain any of the keywords with a first classification type, wherein the first classification type comprises an explanatory sentence that provides context information;
identifying a sentence from the plurality of sentences that contains one or more keywords, wherein the sentence is identified after associating the one or more sentences with the first classification type;
associating the sentence that contains one or more keywords with a second classification type, wherein the second classification type comprises an actionable sentence;
linking the sentence associated with the second classification type with the one or more sentences associated with the first classification type to generate a set of sentences that comprise the one or more sentences that are associated with the first classification type and the sentence that is associated with the second classification type, wherein the set of sentences groups the one or more explanatory sentence with the actionable sentence to provide context for the actionable sentence;
obtaining a classification description, wherein:
   the classification description comprises text associated with a document; and
   the classification description is linked with a token that references a classification description; and
linking the token with the set of sentences that comprise the sentence associated with the second classification type and the one or more sentences associated with the first classification type.

9. The method of claim 8, wherein obtaining the plurality of sentence from the document comprises:

receiving the document;
converting the document into a markup language code;
identifying a plurality of tags within the markup language code, wherein the plurality of tags demarcate portions of the markup language code;
parsing the document into one or more logical sections based on the plurality of tags, wherein a logical section comprises a portion of the text from the document; and
identifying the plurality of sentences within the one or more logical sections.

10. The method of claim 9, wherein parsing the document into the one or more logical sections comprises:
identifying a first tag associated with a first page number;
identifying a second tag associated with a second page number; and
associating text within the markup language code between the first tag and the second tag as a logical section corresponding with a page of the document.

11. The method of claim 9, wherein parsing the document into the one or more logical sections comprises:
identifying a first tag associated with a first font change;
identifying a second tag associated with a second font change; and
associating text within the markup language code between the first tag and the second tag with a logical section corresponding with a section of the document.

12. The method of claim 9, wherein parsing the document into the one or more logical sections comprises:
identifying a first paragraph tag;
identifying a second paragraph tag; and
associating text within the markup language code between the first paragraph tag and the second paragraph tag as a logical section corresponding with a paragraph of the document.

13. The method of claim 8, further comprising linking each sentence from the plurality of sentences with a location identifier that identifies a location within the document where a sentence is located.

14. The method of claim 13, wherein linking each sentence from the plurality of sentences comprises:
determining a logical section that contains a sentence;
identifying tags associated with the logical section that contains the sentence;
determining a location identifier based on the tags associated with the logical section that contains the sentence; and
linking the sentence with the location identifier.

15. A non-transitory computer readable medium storing instructions that when executed by a processor cause the processor to:
obtain a plurality of sentences from a document;
compare words in each of the plurality of sentences to a set of predefined keywords, wherein each keyword is associated with an action;
identify one or more sentences from the plurality of sentences that do not contain any of the keywords;
associate the one or more sentences that do not contain any of the keywords with a first classification type, wherein the first classification type comprises an explanatory sentence that provides context information;
identify a sentence from the plurality of sentences that contains one or more keywords, wherein the sentence is identified after associating the one or more sentences with the first classification type;
associate the sentence that contains one or more keywords with a second classification type, wherein the second classification type comprises an actionable sentence;
link the sentence associated with the second classification type with the one or more sentences associated with the first classification type to generate a set of sentences that comprise one or more sentences that are associated with the first classification type and the sentence that is associated with the second classification type, wherein the set of sentences groups the one or more explanatory sentence with the actionable sentence to provide context for the actionable sentence;
obtain a classification description, wherein:
the classification description comprises text associated with a document; and
the classification description is linked with a token that references a classification description; and
link the token with the sentence associated with the second classification type and the one or more sentences associated with the first classification type.

16. The non-transitory computer-readable medium of claim 15, wherein obtaining the plurality of sentence from the document comprises:
receiving the document;
converting the document into a markup language code;
identifying a plurality of tags within the markup language code, wherein the plurality of tags demarcate portions of the markup language code;
parsing the document into one or more logical sections based on the plurality of tags, wherein a logical section comprises a portion of the text from the document; and
identifying the plurality of sentences within the one or more logical sections.

17. The non-transitory computer-readable medium of claim 16, wherein parsing the document into the one or more logical sections comprises:
identifying a first tag associated with a first page number;
identifying a second tag associated with a second page number; and
associating text within the markup language code between the first tag and the second tag as a logical section corresponding with a page of the document.

18. The non-transitory computer-readable medium of claim 16, wherein parsing the document into the one or more logical sections comprises:
identifying a first tag associated with a first font change;
identifying a second tag associated with a second font change; and
associating text within the markup language code between the first tag and the second tag with a logical section corresponding with a section of the document.

19. The non-transitory computer-readable medium of claim 16, wherein parsing the document into the one or more logical sections comprises:
identifying a first paragraph tag;
identifying a second paragraph tag; and
associating text within the markup language code between the first paragraph tag and the second paragraph tag as a logical section corresponding with a paragraph of the document.

20. The non-transitory computer-readable medium of claim 15, wherein the instructions further cause the processor to link each sentence from the plurality of sentences with a location identifier that identifies a location within the document where a sentence is located, wherein linking each sentence from the plurality of sentences comprises:
determining a logical section that contains a sentence;

identifying tags associated with the logical section that contains the sentence;

determining a location identifier based on the tags associated with the logical section that contains the sentence; and linking the sentence with the location identifier.

* * * * *